United States Patent
Ito

(10) Patent No.: US 8,305,478 B2
(45) Date of Patent: Nov. 6, 2012

(54) IMAGING DEVICE, DISPLAY CONTROL DEVICE, IMAGE DISPLAY SYSTEM, AND IMAGING SYSTEM FOR DISPLAYING REDUCED IMAGES BASED ON ASPECT RATIO

(75) Inventor: Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 1069 days.

(21) Appl. No.: 12/162,544

(22) PCT Filed: Dec. 6, 2006

(86) PCT No.: PCT/JP2006/024382
§ 371 (c)(1),
(2), (4) Date: Jul. 29, 2008

(87) PCT Pub. No.: WO2007/086197
PCT Pub. Date: Aug. 2, 2007

(65) Prior Publication Data
US 2010/0302408 A1    Dec. 2, 2010

(30) Foreign Application Priority Data
Jan. 30, 2006 (JP) .................................. 2006-020796

(51) Int. Cl.
H04N 5/222 (2006.01)
H04N 5/76 (2006.01)
(52) U.S. Cl. ............ 348/333.12; 348/333.05; 348/231.3
(58) Field of Classification Search .............. 348/231.2, 348/231, 3, 231.6, 333.05, 333.11, 333.12
See application file for complete search history.

(56) References Cited

U.S. PATENT DOCUMENTS

| 5,973,734 | A  | * | 10/1999 | Anderson | 348/239 |
|---|---|---|---|---|---|
| 6,262,769 | B1 | * | 7/2001 | Anderson et al. | 348/333.1 |
| 7,305,146 | B2 | * | 12/2007 | Cheatle | 382/296 |
| 7,346,212 | B2 | * | 3/2008 | Cheatle | 382/173 |
| 7,375,755 | B2 | * | 5/2008 | Oya et al. | 348/333.02 |
| 7,561,793 | B2 | * | 7/2009 | Brost | 396/380 |
| 7,599,100 | B2 | * | 10/2009 | Higuchi et al. | 358/403 |
| 2003/0063200 | A1 | * | 4/2003 | Isoyama | 348/239 |
| 2004/0165087 | A1 | * | 8/2004 | Harada | 348/239 |
| 2005/0156948 | A1 | * | 7/2005 | Hunt | 345/648 |

(Continued)

FOREIGN PATENT DOCUMENTS
JP        11-212755       8/1999
(Continued)

Primary Examiner — John Villecco
Assistant Examiner — Selam Gebriel
(74) Attorney, Agent, or Firm — McDermott Will & Emery LLP

(57) ABSTRACT

An imaging device is capable of recording images having various aspect ratios and of realizing an easily viewable and convenient thumbnail display. The imaging device includes: an imaging optical system; an imaging sensor for outputting image signals of optical image of object; an aspect ratio switching section for switching aspect ratios of shot images; an image recording section for interrelating and recording the image signals and aspect ratio information; a display section for displaying reduced images; a specification section for receiving a specification made by a user with respect to the aspect ratio information of reduced images to be displayed on the display section; and an image display control section for determining a location and a display size of each of the reduced images on the display section, and the number of the reduced images displayed on the display section in accordance with the specified aspect ratio information.

21 Claims, 38 Drawing Sheets

U.S. PATENT DOCUMENTS

| | | |
|---|---|---|
| 2006/0017694 A1* | 1/2006 | Shikata .................. 345/158 |
| 2006/0098186 A1* | 5/2006 | Yumiki .................. 356/3.07 |
| 2006/0197844 A1 | 9/2006 | Sekiguchi |
| 2007/0098238 A1* | 5/2007 | Obrador .................. 382/128 |
| 2007/0223900 A1* | 9/2007 | Kobayashi et al. ............ 396/50 |

FOREIGN PATENT DOCUMENTS

| | | |
|---|---|---|
| JP | 11-250224 | 9/1999 |
| JP | 2000-036934 | 2/2000 |
| JP | 2001-045354 | 2/2001 |
| JP | 2002-330322 | 11/2002 |
| JP | 2005-191764 | 7/2005 |
| JP | 2005-318278 | 11/2005 |
| JP | 2006-237876 | 9/2006 |

* cited by examiner

| ASPECT RATIO | ASPECT RATIO DETERMINATION SIGNAL |
|---|---|
| 4:3 | 3 |
| 16:9 | 4 |

| CAMERA ATTITUDE | ATTITUDE DETERMINATION SIGNAL |
|---|---|
| 0° (HORIZONTAL SHOOTING ATTITUDE) | 0 |
| 90° (VERTICAL SHOOTING ATTITUDE) | 1 |

IMAGING DEVICE, DISPLAY CONTROL DEVICE, IMAGE DISPLAY SYSTEM, AND IMAGING SYSTEM FOR DISPLAYING REDUCED IMAGES BASED ON ASPECT RATIO

RELATED APPLICATIONS

This application is the U.S. National Phase under 35 U.S.C. §371 of International Application No. PCT/JP2006/324382, filed on Dec. 6, 2006, which in turn claims the benefit of Japanese Application No. 2006-020796, filed on Jan. 30, 2006, the disclosures of which Applications are incorporated by reference herein.

TECHNICAL FIELD

The present invention relates to a display method of images shot by an imaging device, and more specifically relates to an imaging device, a display control device, and a display device which control a display method of shot images in accordance with attitude information of the imaging device and aspect ratios of the shot images.

BACKGROUND ART

In recent year, an imaging sensor such as a CCD (Charge Coupled Device) and a CMOS (Complementary Metal-Oxide Semiconductor), and a signal processing circuit are increasingly improved in terms of integration density and come to be available inexpensively. Accordingly, a digital still camera and a digital video camera (hereinafter simply referred to as a "digital camera"), which are capable of converting an optical image of an object into an electrical image signal and outputting the same, are rapidly growing popular.

FIGS. 41A to 41C are diagrams each showing a relation between an attitude of the digital camera and an attitude of an obtained image displayed on a display section thereof. As shown in FIGS. 41A to 41C, a photographer performs shooting by changing the attitude of a digital camera 500 in accordance with a shooting intention. For example, in the case of shooting a horizontally oriented object such as a landscape, the photographer turns the attitude of the digital camera 500 so as to be in a horizontally oriented state and then performs shooting. On the other hand, in the case of shooting a vertically oriented object such as a person and a building, the photographer turns the attitude of the digital camera 500 so as to be in a vertically oriented state and then performs shooting. Hereinafter, as shown in FIG. 41A, the attitude of the digital cameral 500 when a stroke direction of a shutter button thereof is in parallel with the gravity direction is referred to as a horizontal shooting attitude. On the other hand, as shown in FIG. 41B, the attitude of the digital camera 500 when the stroke direction of the shutter button is perpendicular to the gravity direction is referred to as a vertical shooting attitude. Further, images shot in the respective attitudes are referred to as a horizontally shot image and a vertically shot image, respectively. In the conventional digital camera 500, a shot image is displayed in the same direction as the attitude of the digital cameral 500 at the time of shooting. That is, in the case where an image shot in the vertical shooting attitude, as shown in FIG. 41B, is displayed on the display section while the digital camera 500 is situated in the horizontal attitude, as shown in FIG. 41C, an orientation of the shot image displayed thereon is different from an orientation of the image at the time of the shooting. Therefore, in the case of displaying a series of shot images in which vertically shot image and horizontally shot image are mixed together, a problem of difficulty in viewing is caused since the orientation of the vertically shot image is different from the orientation at the time of the shooting.

Against this problem, there has been proposed a digital camera having rotation state detection means for detecting a rotation state of photoelectric conversion means and adding means for adding rotation state information at the time of the shooting to an image signal obtained based on an output from the photoelectric conversion means (Patent document 1).

According to the digital camera disclosed in Patent document 1, by adding the rotation state information to the obtained image signal, the attitude of the digital camera at the time of the shooting is detected, whereby a display in accordance with the attitude at the time of the shooting can be performed regardless of whether the image is shot in the horizontal shooting attitude or in the vertical shooting attitude.

On the other hand, in the conventional digital camera, an aspect ratio of a shot image to be recorded is fixed to a predetermined ratio (for example, a ratio of a width to a length is 4:3). Therefore, in order to shoot in a different aspect ratio, a photographer needs to change the digital camera to another digital camera which is capable of shooting in another aspect ratio.

In recent years, a display device for a high definition whose display screen has an aspect ratio of 16:9 is growing popular. In order to display a shot image having the aspect ratio of 4:3 on such display device, the photographer needs to process the shot image with trimming processing or the like, and needs to perform complicated operations.

Against this, a video recording device which is cable of recording an image having the aspect ratio of 16:9 and an image having the aspect ratio of 4:3 in a single video recording medium is proposed (Patent document 2). FIG. 42 is a schematic block diagram of a video recording device 600 described in Patent document 2. Since the video recording device 600 includes switching means 612, a vertical deflection circuit 611 and a vertical deflection coil 606, a video can be recorded in various aspect ratios. Accordingly, the photographer can perform shooting in any aspect ratio in accordance with a shooting scene.

Patent document 1: Japanese Laid-Open Patent Publication No. 2001-45354
Patent document 2: Japanese Laid-Open Patent Publication No. 2000-36934

DISCLOSURE OF THE INVENTION

Problems to be Solved by the Invention

For checking a plurality of images recorded in a digital camera, a method of displaying a list of shot images on a display section provided to the digital camera is known. FIG. 43 shows an example in which a list of shot images is displayed by the digital camera described in Patent document 1. As shown in FIG. 43, on a display section 550, each of the shot images is displayed in a reduced form so as to be displayed as a list. Hereinafter, to display a plurality of reduced images on the display section as a list is referred to as a thumbnail display, and an image reduced for a list display is referred to as a thumbnail image. Further, the thumbnail image corresponding to an image shot in a horizontal shooting attitude is referred to as a horizontal thumbnail image, whereas the thumbnail image corresponding to an image shot in a vertical shooting attitude is referred to as a vertical thumbnail image.

As shown in FIG. 43, according to the invention disclosed in Patent document 1, when shot images are displayed in a thumbnail form, a display can be performed after attitudes at the time of the shooting are restored, regardless of horizontally shot images or vertically shot images. However, the vertical thumbnail image displayed on the display section 550 is narrow in the horizontal direction compared with the horizontal thumbnail image, and cannot be displayed in an enlarged manner. Therefore, the size of the vertical thumbnail image displayed on the display section 550 is smaller than a size of the horizontal thumbnail image, which causes a problem in that the photographer has difficulty in viewing, and a problem of poor viewability.

Further, according to the invention described in Patent document 2, the video recording device is capable of recording images having various aspect ratios. However, Patent document 2 does not suggest a display method of the images having the various aspect ratios.

Therefore, an object of the present invention is to provide an imaging device, a display control device, an image display system and an imaging system which are capable of recording images having various aspect ratios and also capable of realizing an easily viewable and convenient thumbnail display.

Solution to the Problems

The object of the present invention is attained by an imaging device having the following configuration.

The imaging device for outputting optical images of objects as electrical image signals, the imaging device including:

an imaging optical system for forming the optical images of the objects;

an imaging sensor for receiving the optical images of the objects formed by the imaging optical system, for converting the optical images into the electrical image signals, and for outputting the electrical image signals;

an aspect ratio switching section for switching aspect ratios of shot images based on the outputted image signals;

an image recording section for interrelating and recording the outputted image signals and aspect ratio information indicative of the aspect ratios;

a display section for displaying reduced images based on the recorded image signals;

a specification section for receiving a specification made by a user with respect to the aspect ratio information of the reduced images to be displayed on the display section; and an image display control section for determining a location and a display size of each of the reduced images on the display section, and the number of the reduced images displayed on the display section in accordance with the specified aspect ratio information, and for causing the reduced images to be displayed on the display section.

The object of the present invention is attained by an imaging device having the following configuration.

The imaging device which outputs optical images of objects as electrical image signals, and which is connectable to a display device, the imaging device including:

an imaging optical system for forming the optical images of the objects;

an imaging sensor for receiving the optical images of the objects formed by the imaging optical system, for converting the optical images into the electrical image signals, and for outputting the electrical image signals;

an aspect ratio switching section for switching aspect ratios of shot images based on the outputted image signals;

an attitude detection section for detecting an attitude of the imaging device at the time of shooting;

an image recording section for interrelating and recording the outputted image signals, aspect ratio information indicative of the aspect ratios, and attitude information indicative of the detected attitude;

a specification section for receiving a specification made by a user with respect to at least one of the aspect ratio information and the attitude information on reduced images to be displayed on the display device; and a display control signal output section for determining a location and a display size of each of the reduced images on the display device, and the number of the reduced images displayed on the display device in accordance with the specified at least one of the aspect ratio information and the attitude information, for restoring an orientation of each of the reduced images so as to correspond to the attitude of the imaging device at the time of the shooting in accordance with the attitude information, and for outputting a display control signal for causing the reduced images to be displayed on the display device.

The object of the present invention is attained by a display control device having the following configuration.

The display control device which is connectable to a display device having a display section, the display control device including:

a reading section for reading image signals recorded in a recording section, and aspect ratio information and attitude information which correspond to the image signals;

a specification section for receiving a specification made by a user with respect to at least one of the aspect ratio information and the attitude information of reduced images to be displayed on the display device; and a display control signal output section for determining a location and a display size of each of the reduced images on the display section, and the number of the reduced images displayed on the display section in accordance with the specified at least one of the aspect ratio information and the attitude information, for restoring an orientation of each of the reduced images so as to correspond to an attitude of an imaging device at the time of shooting in accordance with the attitude information, and for outputting a display control signal for causing the restored reduced images to be displayed on the display section.

The object of the present invention is attained by an image display system having the following configuration.

The image display system including an imaging device for outputting optical images of objects as electrical image signals and a display device for displaying shot images, wherein the imaging device includes:

an imaging optical system for forming the optical images of the objects;

an imaging sensor for receiving the optical images of the objects formed by the imaging optical system, for converting the optical images into the electrical image signals, and for outputting the electrical image signals;

an aspect ratio switching section for switching aspect ratios of shot images based on the outputted image signals;

an attitude detection section for detecting an attitude of the imaging device at the time of shooting;

an image recording section for interrelating and recording the outputted image signals, aspect ratio information indicative of the aspect ratios, and attitude information indicative of the detected attitude;

a specification section for receiving a specification made by a user with respect to at least one of the aspect ratio information and the attitude information on reduced images to be displayed on the display device; and a display control signal output section for determining a location and a display size of each of the reduced images on the display device, and the number of the reduced images displayed on the display device in accordance with the specified at least one of the aspect ratio information and the attitude information, for restoring an orientation of each of the reduced images so as to correspond to the attitude of the imaging device at the time of the shooting in accordance with the attitude information, and for outputting a display control signal for causing the reduced images to be displayed on the display section, the display device comprises:

a receiving section for receiving the recorded image signals and the outputted display control signal; and a display section for displaying the reduced image based on the image signals in accordance with the display control signal.

The object of the present invention is attained by an imaging system having the following configuration.

The imaging system including a lens barrel and an imaging device which is detachably fixed to the lens barrel, wherein the lens barrel includes an imaging optical system for forming optical images of objects, the imaging device includes:

an imaging sensor for receiving the optical images of the objects formed by the imaging optical system connected thereto, for converting the optical images into the electrical image signals, and for outputting the electrical image signals;

an aspect ratio switching section for switching aspect ratios of shot images based on the outputted image signals;

an attitude detection section for detecting an attitude of the imaging device at the time of shooting;

an image recording section for interrelating and recording the outputted image signals, aspect ratio information indicative of the aspect ratios, attitude information indicative of the detected attitude;

a display section for displaying reduced images based on the recorded image signals;

a specification section for receiving a specification made by a user with respect to at least one of the aspect ratio information and the attitude information on the reduced images to be displayed on the display section; and an image display control section for determining a location and a display size of each of the respective reduced images on the display device, and the number of the reduced images displayed on the display device in accordance with the specified at least one of the aspect ratio information and the attitude information, for restoring an orientation of each of the reduced images so as to correspond to the attitude of the imaging device at the time of the shooting in accordance with the attitude information, and for causing the reduced images to be displayed on the display section.

The object of the present invention is attained by an imaging system having the following configuration.

The imaging system including a lens barrel and an imaging device which is detachably fixed to the lens barrel, wherein the lens barrel includes:

an imaging optical system for forming optical images of objects; and an attitude detection section for detecting an attitude of the imaging device at the time of shooting, the imaging device includes:

an imaging sensor for receiving the optical images of the objects formed by the imaging optical system connected thereto, for converting the optical images into the electrical image signals, and for outputting the electrical image signals;

an aspect ratio switching section for switching aspect ratios of shot images based on the outputted image signals;

an attitude detection section for detecting an attitude of the imaging device at the time of the shooting;

an image recording section for interrelating and recording the outputted image signals, aspect ratio information indicative of the aspect ratios, attitude information indicative of the detected attitude;

a display section for displaying reduced images based on the recorded image signals;

a specification section for receiving a specification made by a user with respect to at least one of the aspect ratio information and the attitude information on the reduced images to be displayed on the display section; and an image display control section for determining a location and a display size of each of the reduced images on the display section, and the number of display sheets of the reduced images on the display section in accordance with the specified at least one of the aspect ratio information and the attitude information, for restoring an orientation of each of the reduced images so as to correspond to the attitude of the imaging device at the time of the shooting in accordance with the attitude information, and for causing the reduced images to be displayed on the display section.

EFFECT OF THE INVENTION

As above described, according to the present invention, it is possible to provide the imaging device, the display control device, the image display system, and the imaging system which are capable of recording images having various aspect ratios, and also capable of realizing an easily viewable and convenient thumbnail display.

Figure 1:
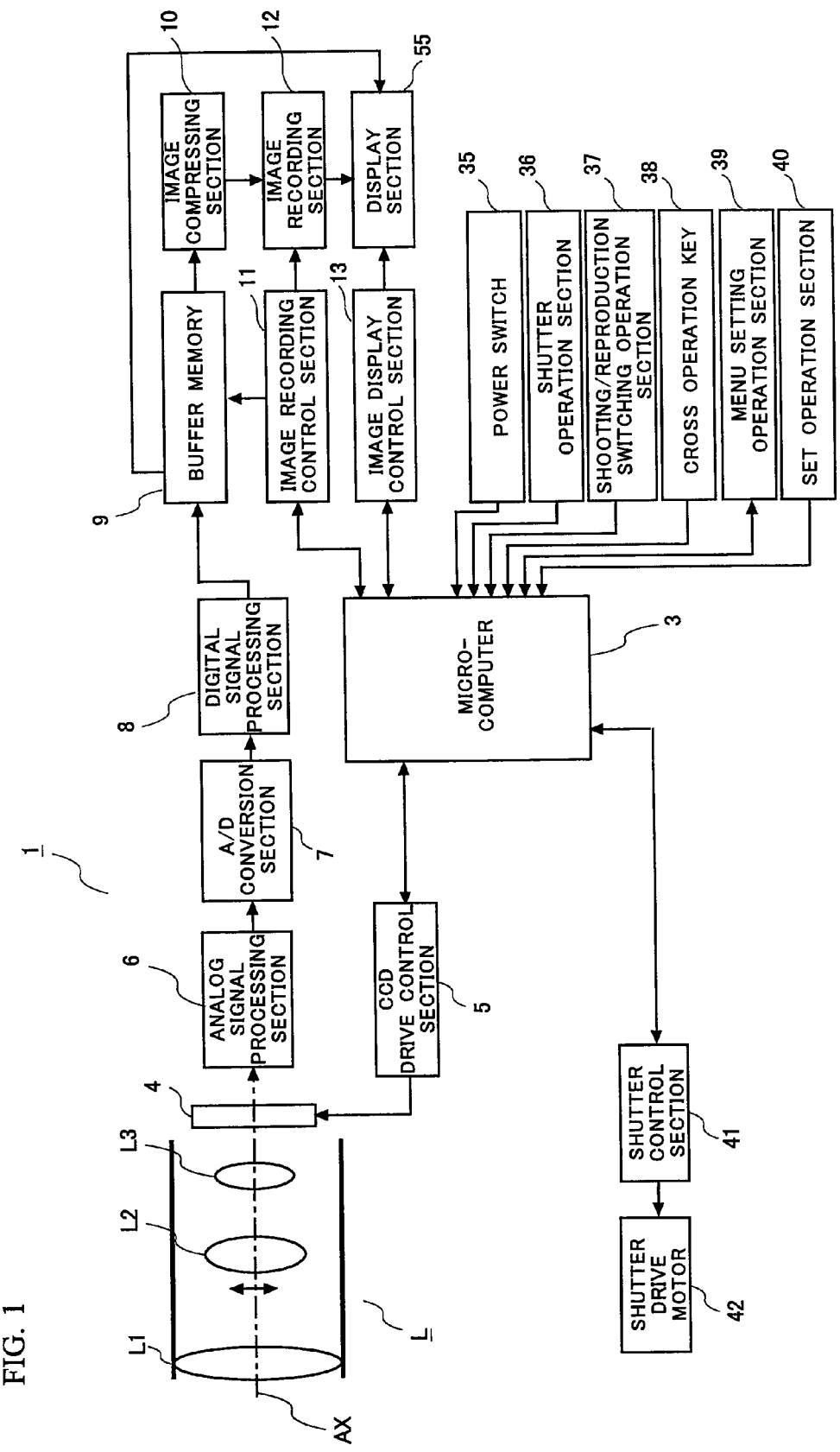
FIG. 1 is a block diagram showing a general configuration of a digital camera according to embodiment 1.

DESCRIPTION OF THE REFERENCE CHARACTERS 1 digital camera
1*a* housing 2 lens
3 microcomputer
4 imaging sensor
5 CCD drive control section
6 analog signal control section
7 A/D conversion section
8 digital signal processing section
9 buffer memory
10 image compressing section
11 image recording control section
12 image recording section
13 image display control section
35 power switch
36 shutter operation section
37 shooting/reproduction switching operation section
38 cross operation key
39 MENU setting operation section
40 SET operation section
41 shutter operation section
42 shutter drive motor
43 attitude detection section
51 removable memory
55 display section
57 zoom operation section
60 attitude determination signal
61 aspect ratio determination signal
62 display priority selection menu
62a standard selection button
62b size priority button
62c number-of-display-images priority button
64 display image type selection menu
64a 4:3 aspect ratio horizontal image selection button
64b 4:3 aspect ratio vertical image selection button
64c 16:9 aspect ratio horizontal image selection button
64d 16:9 aspect ratio vertical image selection button
64e horizontal image selection button
64f vertical image selection button
64g 4:3 aspect ratio image selection button
64h 4:3 aspect ratio image selection button
65 aspect ratio selection menu
65a 4:3 aspect ratio selection button
65b 16:9 aspect ratio selection button
69 aspect ratio switch menu
69a 4:3 aspect ratio switching button
69b 16:9 aspect ratio switching button
70 display device
75 cable
80 display device
81 removable memory insertion section
82 display control device
90 shot image folder
91 still image folder
92 moving image folder
93a, 93b horizontal image folder
94a, 94b vertical image folder
95 still image
96 moving image
97a, 97b, 97c 4:3 aspect ratio folder
98a, 98b, 98c 16:9 aspect ratio folder
100 digital camera
150 layout storage section
200 digital camera
L imaging optical system
L1 first lens unit
L2 second lens unit
L3 third lens unit
Sh 4:3 aspect ratio horizontal image
Sv 4:3 aspect ratio vertical image
Wh 16:9 aspect ratio horizontal image
Wv 16:9 aspect ratio vertical image

BEST MODE FOR CARRYING OUT THE INVENTION (Embodiment 1)

FIG. 1 is a block diagram showing a general configuration of a digital camera 1 according to embodiment 1 of the present invention. As shown in FIG. 1, the digital camera 1 includes an imaging optical system L, a microcomputer 3, an imaging sensor 4, a CCD drive control section 5, an analog signal processing section 6, an A/D conversion section 7, a digital signal processing section 8, a buffer memory 9, an image compressing section 10, an image recording control section 11, an image recording section 12, an image display control section 13, a display section 55, a shutter control section 41, and a shutter drive motor 42.

The imaging optical system L is an optical system including three lens units L1, L2 and L3. The first lens unit L1 moves in an optical axis direction, whereby zooming is performed. The third lens unit L3 moves in the optical axis direction, whereby focusing is performed. The second lens unit L2 is a compensation lens unit, and plays a role of compensating a motion of an image by moving on a plane perpendicular to the optical axis and by decentering the optical axis.

The microcomputer 3 controls the whole of the digital camera 1. The microcomputer 3 is capable of receiving respective signals from a power switch 35, a shutter operation section 36, a shooting/reproduction switching operation section 37, a cross operation key 38, a MENU setting operation section 39, and a SET operation section 40.

The shutter operation section 36 is, for example, typified by a release button, and is operated by a photographer at the time of shooting. When the shutter operation section 36 is operated, a timing signal is outputted to the microcomputer 3. In accordance with a control signal which is outputted from the microcomputer 3 upon reception of the timing signal, the shutter control section 41 drives the shutter drive motor 42 and then actuates the shutter.

The imaging sensor 4 is, for example, a CCD, and converts an optical image, which is formed by the imaging optical system L, into an electrical signal. The imaging sensor 4 is drive-controlled by the CCD drive control section 5. The imaging sensor 4 may be a CMOS.

An image signal outputted from the imaging sensor 4 is transmitted and processed through the analog signal processing section 6, the A/D conversion section 7, the digital signal processing section 8, the buffer memory 9, and the image compressing section 10, in sequence. In the analog signal processing section 6, the image signal outputted from the imaging sensor 4 is subject to analog signal processing such as gamma processing. The A/D conversion section 7 converts an analog signal outputted from the analog signal processing section 6 into a digital signal. In the digital signal processing section 8, the image signal, which is the digital signal converted by the A/D conversion section 7, is subject to digital signal processing such as noise reduction, edge enhancement, and aspect ratio switching processing which is described later. The buffer memory 9 is a RAM (Random Access Memory), and temporarily stores the image signal processed by the digital signal processing section 8.

The image signal stored in the buffer memory 9 is transmitted and processed through the image compressing section 10 to the image recording section 12, in sequence. The image signal stored in the buffer memory 9 is read in accordance with a command issued by the image recording control section 11, and transmitted to the image compressing section 10. The image signal data transmitted to the image compressing section 10 is compressed at a predetermined rate, and thus a data size thereof is reduced. As the compressing method, a JPEG (Joint Photographic Experts Group) method may be adopted, for example. At the same time, the image compressing section 10 also creates a reduced image signal which corresponds to a shot image and which is used for a thumbnail display or the like. Thereafter, the compressed image signal and the reduced image signal are transmitted to the image recording section 12.

The image recording section 12 interrelates and records the image signal, the corresponding reduced image signal, and predetermined information to be recorded in accordance with a command issued by the image recording control section 11. The image recording section 12 is typified by an internal memory and/or a removable memory, for example. The predetermined information to be recorded together with the image signal includes a date when an image was shot, focal length information, shutter speed information, aperture value information, shooting mode information, and information about an attitude of the digital camera which is described later.

The image display control section 13 is controlled by the control signal from the microcomputer 3. In accordance with a command from the image display control section 13, the display section 55 causes the image signal or the reduced image signal recorded in the image recording section 12 or in the buffer memory 9 to be displayed as a visible image. The display section 55 is typified by an LCD monitor, for example. In the present embodiment, a case where the display section 55 has an aspect ratio of 4:3 will be described.

As display modes, the display section 55 has a mode to display only an image signal as the visible image, and a mode to display the image signal and information at the time of shooting as the visible image. The information at the time of the shooting of the image signal includes the focal length information, the shutter speed information, the aperture value information, the shooting mode information, the focusing state information, and the attitude information. These pieces of information are displayed when the photographer operates the MENU setting operation section 39.

Figure 2A:
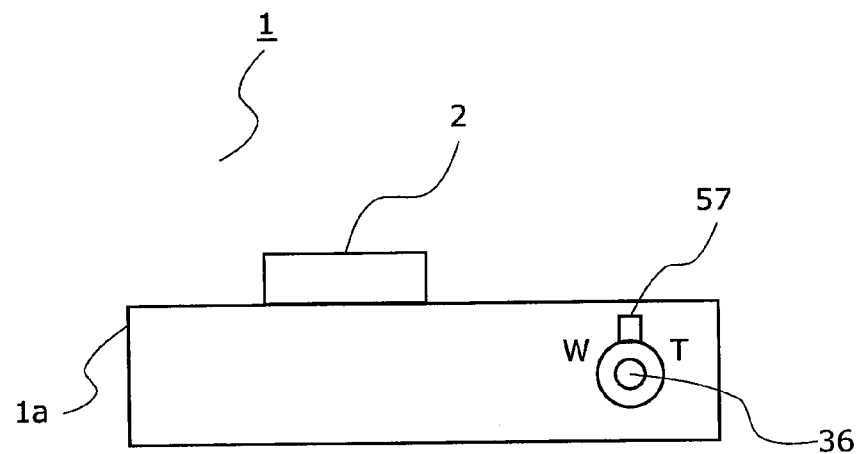
FIG. 2A is a top view of the digital camera according to embodiment 1.
Figure 2B:
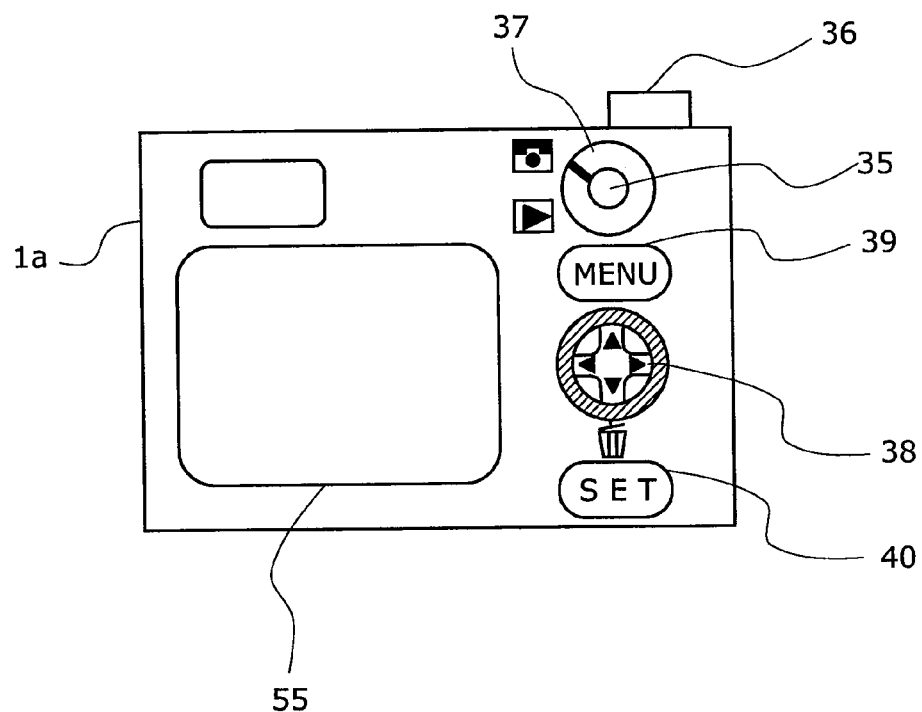
FIG. 2B is a back view of the digital camera according to embodiment 1.

Next, a configuration of the digital camera 1 according to embodiment 1 will be described, with reference to FIGS. 2A and 2B. FIG. 2A is a top view of the digital camera 1, and FIG. 2B is a back view of the digital camera 1.

A housing 1a has situated on a front surface thereof the imaging optical system including a lens 2, and also has situated on a back surface thereof the power switch 35, the shooting/reproduction switching operation section 37, the cross operation key 38, the MENU setting operation section 39, the SET operation section 40, and the display section 55 which is composed of the LCD monitor. Further, The housing 1a has situated on a top surface thereof the shutter operation section 36 and a zoom operation section 57.

The zoom operation section 57 is located in the vicinity of the shutter operation section 36 so as to rotate coaxially with the shutter operation section 36. The power switch 35 is an operation member for turning the power of the digital camera 1 ON/OFF. The shooting/reproduction switching operation section 37 is an operation member for switching between a shooting mode and a reproducing mode, and when a lever thereof is rotated, switching is performed. When the zoom operation section 57 is rotated to the right while the shooting mode is selected, the imaging optical system L is switched to be telephoto. On the other hand, the zoom operation section 57 is rotated to the left, the imaging optical system L is switched to be wide-angle.

The MENU setting operation section 39 is an operation member for causing various menus to be displayed on the display section 55. The cross operation key 38 is an operation member for selecting any one of the various operation menus, which are displayed on the display section 55 in accordance with the operation of the MENU setting operation section 39, by pressing any one of upper, lower, left and right portions of the cross operation key 38. When any one of the various operation menus is selected in accordance with the operation of the cross operation key 38, the microcomputer 3 issues a command for executing an operation of the selected menu. The SET operation section 40 is an operation member for returning the display of the various operation menus to a state prior to such display.

Figure 3:
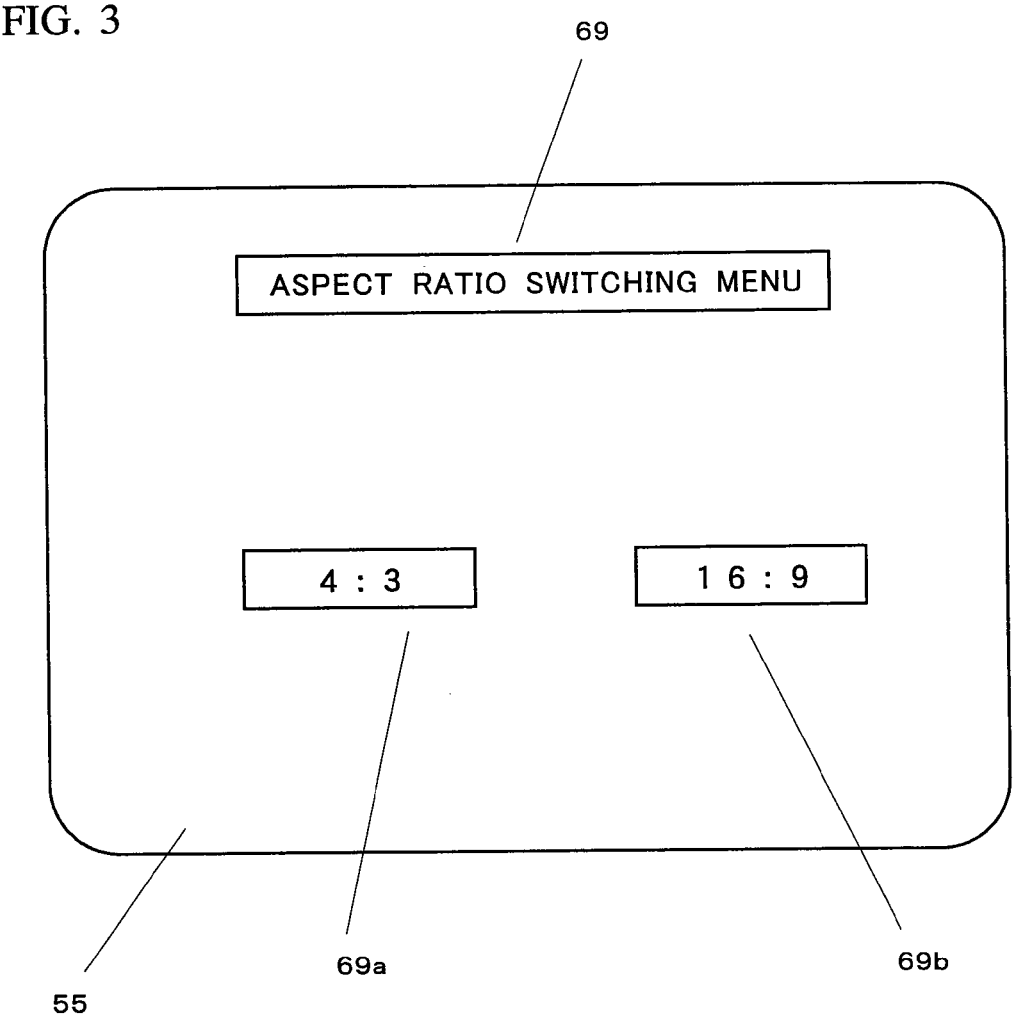
FIG. 3 is an example of an aspect ratio switch menu displayed on a display section according to embodiment 1.
Figure 4:
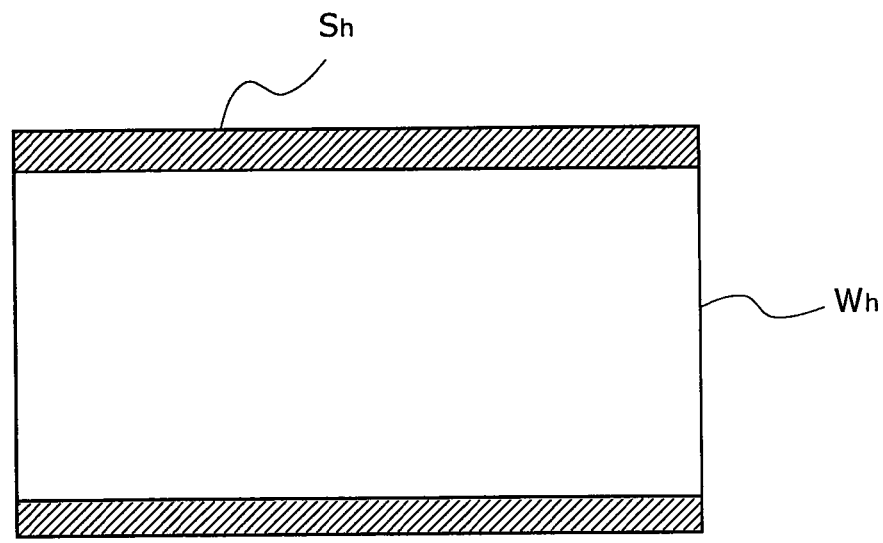
FIG. 4 is diagram showing a relation between a horizontal image having an aspect ratio of 4:3 and a horizontal image having an aspect ratio of 16:9 in embodiment 1.
Figures 5, 6:
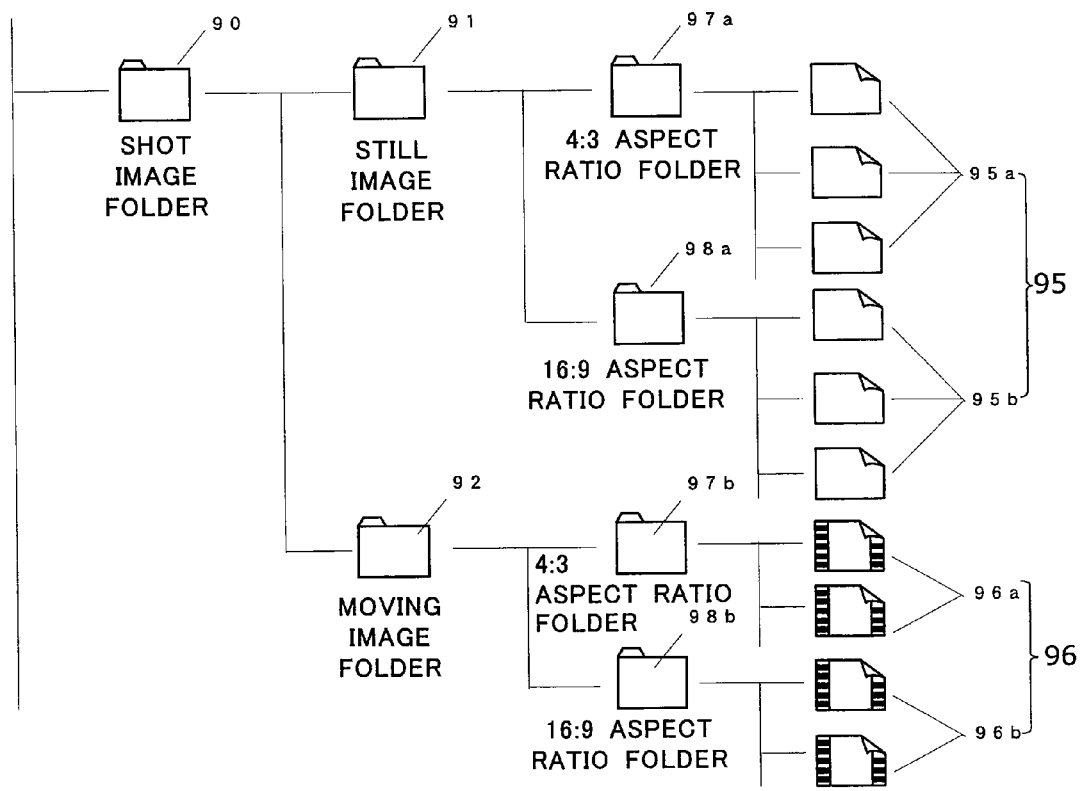
FIG. 5 is a diagram showing a relation between aspect ratios of images and aspect ratio determination signals in embodiment 1.
FIG. 6 is a diagram showing an example of image folders created in an image recording section in embodiment 1.

Next, processing for switching an aspect ratio of a shot image will be described with reference to FIGS. 3 to 5. FIG. 3 shows an exemplary aspect ratio switch menu 69 displayed on the display section 55. FIG. 4 shows a relation between a horizontal image Sh having an aspect ratio of 4:3 and a horizontal image Wh having an aspect ratio of 16:9. FIG. 5 shows a relation between aspect ratios of images and aspect ratio determination signals. The aspect ratio of the shot image basically depends on the aspect ratio of the imaging sensor 4. Accordingly, in the case where the imaging sensor 4 has the aspect ratio of 4:3, for example, a shot image having the aspect ratio of 4:3 will be outputted. In the digital camera 1 according to the present embodiment, the image signal outputted from the imaging sensor 4 is subject to the aspect ratio switching processing, whereby an image having an arbitrary aspect ratio can be recorded regardless of the aspect ratio of the imaging sensor 4. An exemplary case will be described hereinbelow where the imaging sensor 4 having the aspect ratio of 4:3 is used, and the images having aspect ratios of 4:3 and 16:9 are recorded.

As shown in FIG. 3, the aspect ratio switch menu 69 has a 4:3 aspect ratio switching button 69a and a 16:9 aspect ratio switching button 69b, and the photographer is allowed to select one of the buttons. From the aspect ratio switch menu 69, when the 16:9 aspect ratio switching button 69b is selected, the digital signal processing section 8 processes the image signal outputted from the imaging sensor 4 with image processing so as to change the aspect ratio thereof. That is, as shown in FIG. 4, the digital signal processing section 8 performs processing for trimming upper and lower portions of an image signal of a shot image Sh having the aspect ratio of 4:3 (hatched areas in the diagram), and then creates an image signal of an image Wh having the aspect ratio of 16:9. The image recording control section 11 adds an aspect ratio determination signal 61(4) indicative of the aspect ratio of 16:9 to the created image signal and records the image signal in the image recording section 12. The aspect ratio determination signal 61 is for example recorded in a header or a footer of the image signal.

On the other hand, when the 4:3 aspect ratio switching button 69a is selected from the aspect ratio switch menu 69, the shot image based on the image signal outputted from the imaging sensor 4 has the aspect ratio of 4:3, and thus the digital signal processing section 8 does not process the image signal with the above-described image processing. The image recording control section 11 adds an aspect ratio determination signal 61(3) indicative of the aspect ratio of 4:3 to the image signal and records the image signal in the image recording section 12.

In this manner, the digital signal processing section 8 processes the image signal outputted from the imaging sensor 4 with the aspect ratio switching processing, and thus the photographer can record an image having a desired aspect ratio regardless of the aspect ratio of the imaging sensor 4. Further, it is not necessary for the photographer to perform complicated operations in order to change the aspect ratio of the shot image, which provides convenience to the photographer.

Figure 7:
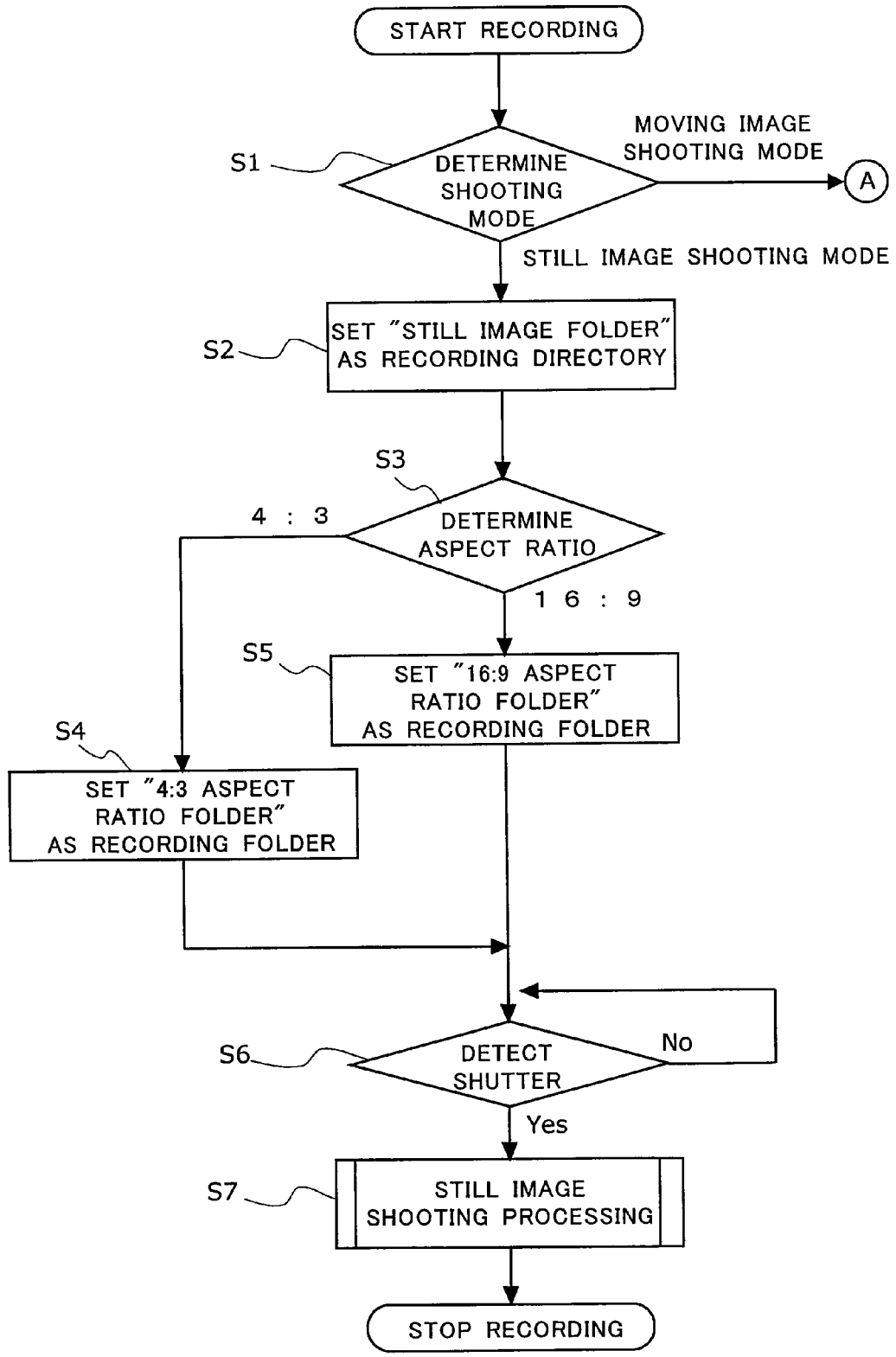
FIG. 7 is a flowchart from a start of recording to an end of the recording in embodiment 1.
Figure 8:
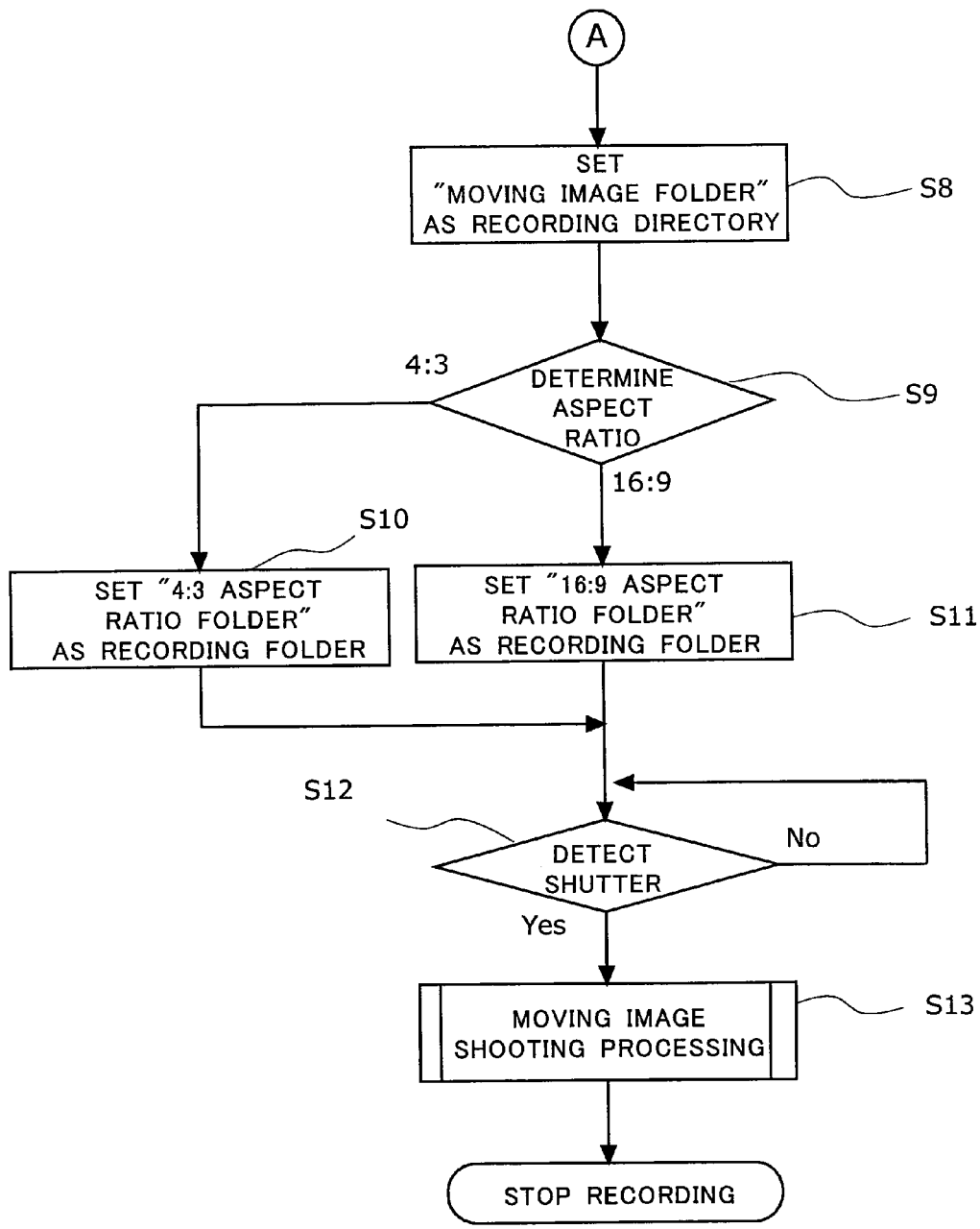
FIG. 8 is another flowchart from the start of recording to the end of the recording in embodiment 1.

With reference to FIGS. 6 to 8, a managing method of an image file for recording the shot image will be described. FIG. 6 is a diagram showing an example of image folders created in the image recording section 12. FIGS. 7 and 8 are flowcharts showing recording processing of the shot image, from a start of recording to an end of the recording. As shown in FIG. 6, in the image recording section 12, a shot image folder 90 is created, and in a hierarchy thereunder, a still image folder 91 and a moving image folder 92 are created. Further, in hierarchies under the still image folder 91 and the moving image folder 92, 4:3 aspect ratio folders 97a and 97b, and 16:9 aspect ratio folders 98a and 98b, which are folders classified by the aspect ratios, are created, respectively.

Shot images are sorted into a folder for a still image and a folder for a moving image, respectively. Thereafter, in accordance with the aspect ratio determination signals 61 added to respective image signals, the shot images are stored in folders which are classified by the aspect ratios, respectively. For example, in the case of a still image, which is shot in a still image shooting mode and which has the aspect ratio of 4:3, the still image is stored in the 4:3 aspect ratio folder 97a as a still image file 95a. In the case of a moving image which is shot in a moving image shooting mode and which has the aspect ratio of 16:9, the moving image is stored in the 16:9 aspect ratio folder 98b as a moving image file 96b.

Next, recording processing of the shot image will be described. As shown in FIG. 7, the photographer operates the MENU setting operation section 39 so as to record the shot image, and causes a screen containing various menus to be displayed on the display section 55. The photographer selects an image recording mode from the displayed screen containing various menus. Accordingly, the digital camera 1 starts the record processing shown in FIG. 7. In step S1, the microcomputer 3 performs determination processing of the shooting mode. That is, the microcomputer 3 determines whether the still image shooting mode or the moving image shooting mode is selected in the digital camera 1. When the still image shooting mode is detected, the processing of the digital camera 1 proceeds to step S2, whereas when the moving image shooting mode is detected, the processing proceeds to processing A shown in FIG. 8.

First, processing (steps S2 to S7) for a case where the still image shooting mode is detected in step S1 will be described. In step S2, the microcomputer 3 sets the still image folder 91 as a recording directory for the shot image. In step S3, the aspect ratio of the shot image is determined. That is, in step S3, in the case where the aspect ratio determination signal 61 (3) is added to the image signal, the aspect ratio thereof is determined to be 4:3, whereas in the case where the aspect ratio determination signal 61(4) is added thereto, the aspect ratio thereof is determined to be 16:9. When the aspect ratio is determined to be 4:3 in step S3, the processing of the digital camera 1 proceeds to step S4, whereas when the aspect ratio is determined to be 16:9, the processing proceeds to step S5.

In step S4, the microcomputer 3 sets the 4:3 aspect ratio folder 97a as the recording folder for the shot image. On the other hand, in step S5, the microcomputer 3 sets the 16:9 aspect ratio folder 98a as the recording folder for the shot image. When the recording folder for the still image is determined in the processing in steps S4 and S5, processing in step S6 is performed subsequently.

In step S6, an operation of the shutter operation section 36 performed by the photographer is received. When the pressing of the shutter operation section 36 is detected, the processing of the digital camera 1 proceeds to step S7, and still image shooting processing is performed. An optical image of an object is then outputted as the image signal. When the still image shooting processing is completed, the image signal is stored in a predetermined folder, and the recording processing ends.

Next, with reference to FIG. 8, the processing A executed in the case where the moving image shooting mode is detected in step S2 will be described. In step S8, the microcomputer 3 sets the moving image folder 92 as the recording directory for the shot image. In step S9, the aspect ratio of the shot image is determined. That is, in step S9, in the same manner as step S3 shown in FIG. 7, in accordance with the aspect ratio determination signal 61 added to the image signal, the aspect ratio determination processing is performed. In the digital camera 1, when the aspect ratio is determined to be 4:3, the processing proceeds to step S10, whereas when the aspect ratio is determined to be 16:9, the processing proceeds to step S11.

In step S10, the microcomputer 3 sets the 4:3 aspect ratio folder 97b as the recording folder for the shot image. On the other hand, in step S11, the microcomputer 3 sets the 16:9 aspect ratio folder 98b as the recording folder for the shot image. When the recording folder for the moving image is determined in the processing in steps S10 and S11, processing in step S12 is performed subsequently.

In step S12, the operation of the shutter operation section 36 performed by the photographer is received. When the pressing of the shutter operation section 36 is detected, the processing of the digital camera 1 proceeds to step S13, and moving image shooting processing is performed. When the moving image shooting processing is completed, the shot image is stored in a predetermined folder, and the recording processing ends. In accordance with the above processing, the shot image is recorded in the image recording section 12 of the digital camera 1.

Figure 9A:
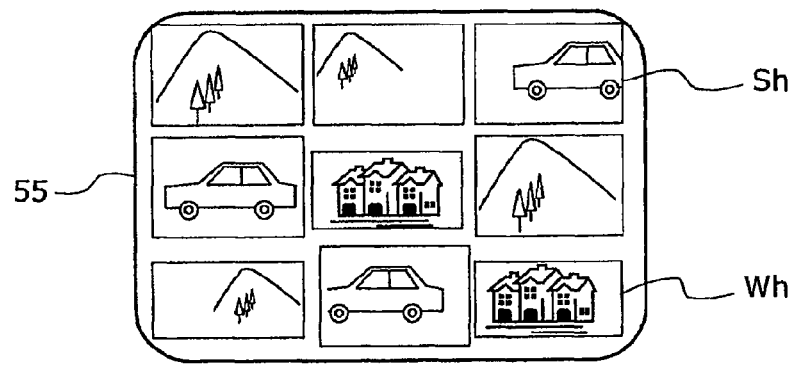
FIG. 9A is an exemplary display of the display section in which shot images are displayed in a thumbnail form in embodiment 1.
Figure 9B:
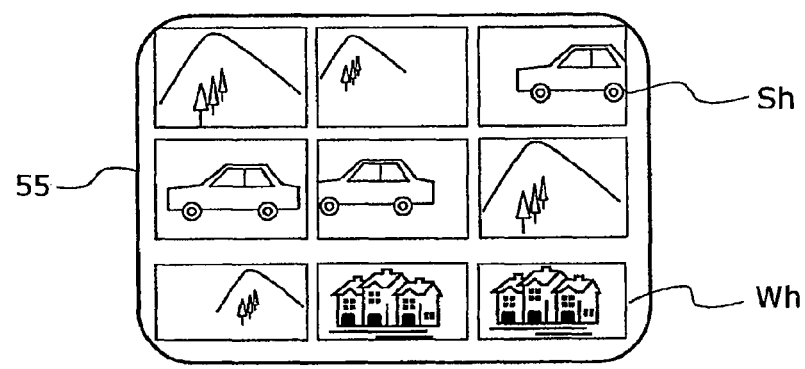
FIG. 9B is an another exemplary display of the display section in which shot images are displayed in a thumbnail form in embodiment 1.
Figure 9C:
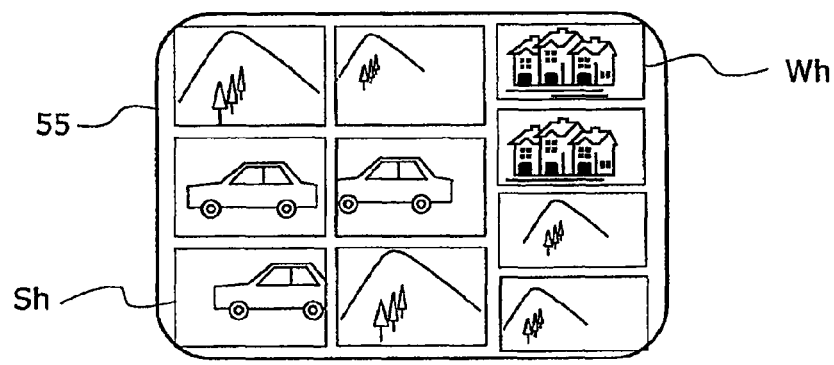
FIG. 9C is an another exemplary display of the display section in which shot images are displayed in a thumbnail form in embodiment 1.

Next, display processing of images shot by the digital camera 1 will be described. In order to display the shot images on the display section 55, the photographer turns the power switch 35 of the digital camera 1 ON. Thereafter, when the photographer turns the shooting/reproduction switching operation section 37 to the reproduction mode, the shot images are displayed on the display section 55 in a thumbnail form. FIGS. 9A to 9C are diagrams each showing an exemplary display of the display section 55 on which a plurality of shot images are displayed in the thumbnail form. As shown in FIG. 9A, the shot images may be displayed in order of the shooting date and time in such a manner that the images Sh each having the aspect ratio of 4:3 and the images Wh each having the aspect ratio of 16:9 are mixed. In this case, on the display section 55, a total of 9 thumbnail images, i.e., 3 images in a vertical direction by 3 images in a horizontal direction, are displayed. As another exemplary display, as shown in FIGS. 9B and 9C, images having common aspect ratios may be arranged and displayed in clusters, respectively. For example, when an arrangement of the respective thumbnail images is changed, as shown in FIG. 9C, a total of 10 thumbnail images can be displayed on the display section 55, whereby a display area on the display section 55 can be used effectively.

Figure 10:
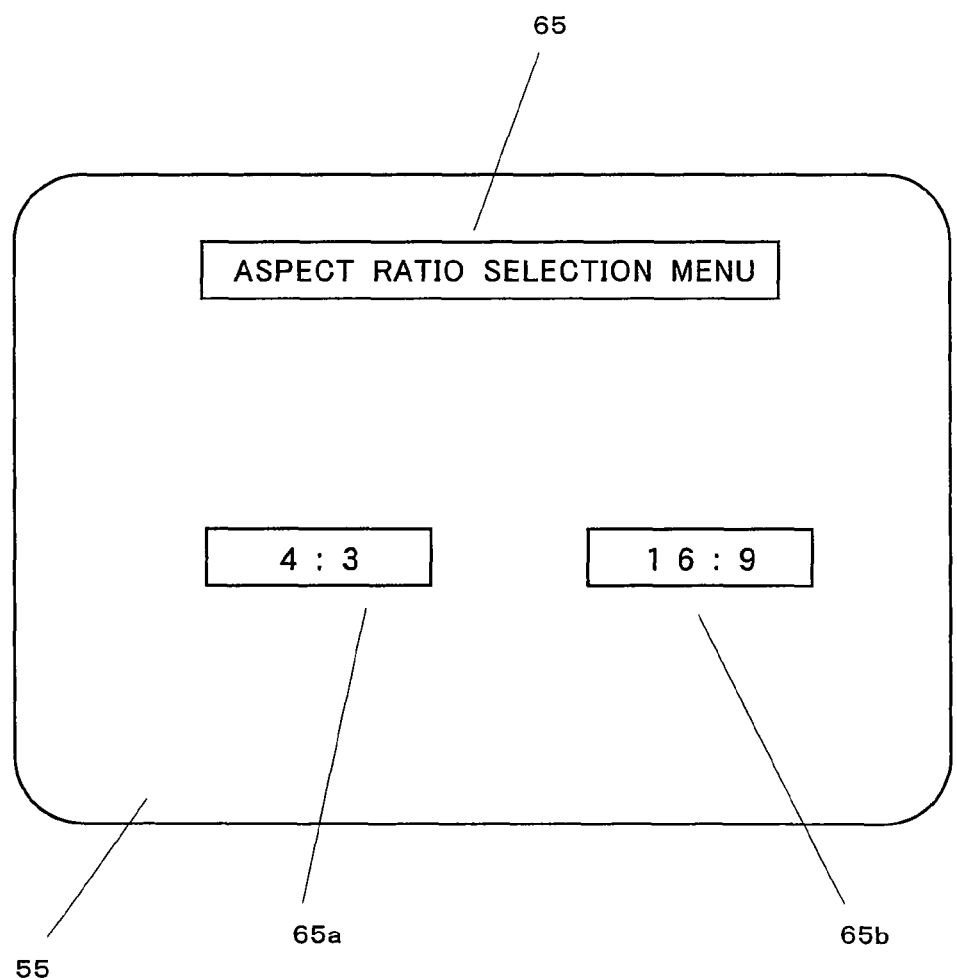
FIG. 10 is an exemplary display of an aspect ratio selection menu displayed on the display section in embodiment 1.
Figure 11A:
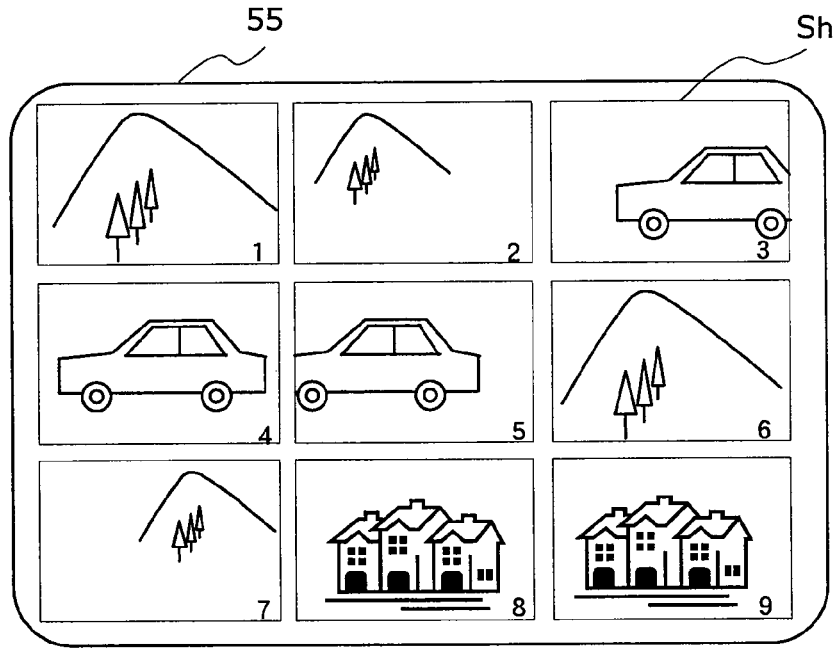
FIG. 11A is an exemplary thumbnail display displayed on the display section in embodiment 1.
Figure 11B:
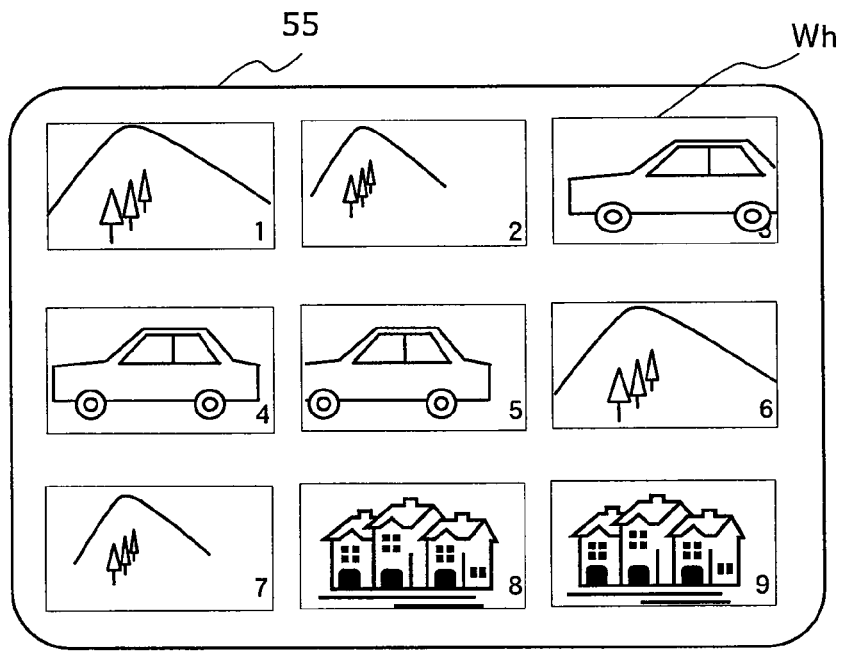
FIG. 11B is another exemplary thumbnail display displayed on the display section in embodiment 1.

Further, in the digital camera 1 according to the present embodiment, only images having the common aspect ratio can be displayed in the thumbnail form. FIG. 10 shows an exemplary display of the aspect ratio selection menu 65 displayed on the display section 55. FIGS. 11A and 11B are diagrams each showing an exemplary thumbnail display on the display section 55.

When the photographer operates the MENU setting operation section 39, the aspect ratio selection menu 65 shown in FIG. 10 is displayed on the display section 55. As shown in FIG. 10, the aspect ratio selection menu 65 includes a 4:3 aspect ratio selection button 65a and a 16:9 aspect ratio selection button 65b, and the photographer can select either of the buttons.

When the 4:3 aspect ratio selection button 65a is selected, the microcomputer 3 extracts still images stored in the 4:3 aspect ratio folder 97a from among shot images recorded in the image recording section 12. As shown in FIG. 11A, the image display control section 13 displays only still images Sh each having aspect ratio of 4:3 in the thumbnail form on the display section 55 in order of extraction. That is, a total of 9 thumbnail images each having the aspect ratio of 4:3, i.e., 3 images in the vertical direction by 3 images in the horizontal direction, are displayed on the display section 55.

On the other hand, when the aspect ratio 16:9 selection button 65b is selected, the microcomputer 3 extracts still images stored in the aspect ratio 16:9 folder 97b from among the shot images recorded in the image recording section 12. As shown in FIG. 11B, the image display control section 13 causes only still images Wh each having the aspect ratio of 16:9 to be displayed in the thumbnail form on the display section 55 in order of extraction. That is, a total of 9 thumbnail images each having the aspect ratio of 16:9, i.e., 3 images in the vertical direction by 3 images in the horizontal direction, are displayed on the display section 55. In this manner, the shot images are managed on an aspect ratio basis, and thus it is possible to easily extract only images having the common aspect ratio and to display the images in the thumbnail form.

In FIGS. 11A and 11B, the photographer can select a desired image from the thumbnail images displayed on the display section 55 by using the cross operation key 38. When the image is selected, the selected image is enlarged and displayed on the display section 55.

As above described, in the digital camera according to the present embodiment, the aspect ratio determination signal is recorded together with each of the shot images, whereby the shot images can be managed on the aspect ratio basis. Accordingly, it is possible to easily extract only images having the common aspect ratio and to display the images in the thumbnail form. Therefore, images having different aspect ratios are not displayed in a mixed manner, and thus an easily viewable and convenient thumbnail display can be realized.

Further, in the digital camera according to the present embodiment, when the images having the different aspect ratios are to be displayed, a display position of the respective thumbnail images, the number of displayed thumbnail images and the like are changed, and then the thumbnail images are displayed in the thumbnail form. Accordingly, the display area on the display section is used effectively, and improved viewability can be provided.

Further, in the digital camera according to the present embodiment, the aspect ratio of the shot image can be changed regardless of the aspect ratio of the imaging sensor. Therefore, the photographer can record the images having the different aspect ratios without performing the complicated operations such as the trimming processing.

Figure 12:
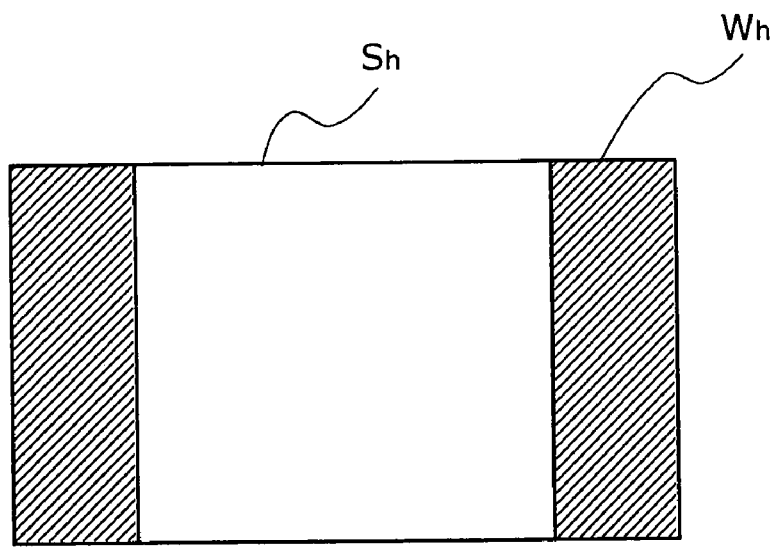
FIG. 12 is a diagram showing a relation between a shot image having the aspect ratio of 4:3 and a shot image having the aspect ratio of 16:9 in embodiment 1.

Although the digital camera according to the present embodiment has the imaging sensor having the aspect ratio of 4:3, the aspect ratio is not limited thereto. An imaging sensor having another aspect ratio may be applicable. For example, an imaging sensor having an aspect ratio of 16:9 or 3:2 may be applicable. When the imaging sensor having the aspect ratio of 16:9 is applied, the imaging sensor 4 outputs a shot image having the aspect ratio of 16:9. Accordingly, when the 4:3 aspect ratio switching button 69a is selected from the aspect ratio switch menu 69 shown in FIG. 4, the digital signal processing section 8 processes the image signal with the aspect ratio switching processing. FIG. 12 shows a relation between the shot image Sh having the aspect ratio of 4:3, and the shot image Wh having the aspect ratio of 16:9. As shown in FIG. 12, the digital signal processing section 8 performs processing for removing left and right portions (hatched areas shown in FIG. 12) from the image signal of the shot image Wh, which has the aspect ratio of 16:9 and was outputted from the imaging sensor 4, and then outputs an image signal having the aspect ratio of 4:3.

In the present embodiment, the aspect ratio switching processing to the image signal may be performed after the image signal is outputted from the imaging sensor, or may be performed while the image signal is being recorded in the image recording section. The aspect ratio determination signal may be added to the shot image at a timing when the shot image is stored in the buffer memory or stored in the image recording section.

As shown in FIGS. 7 and 8, the digital camera according to the present embodiment determines a folder to store the image signal before shooting, but is not limited thereto. For example, the folder to store the shot image may be determined after shooting in accordance with the aspect ratio determination signal, or may be determined by a user after shooting.

(Embodiment 2)

Figure 13:
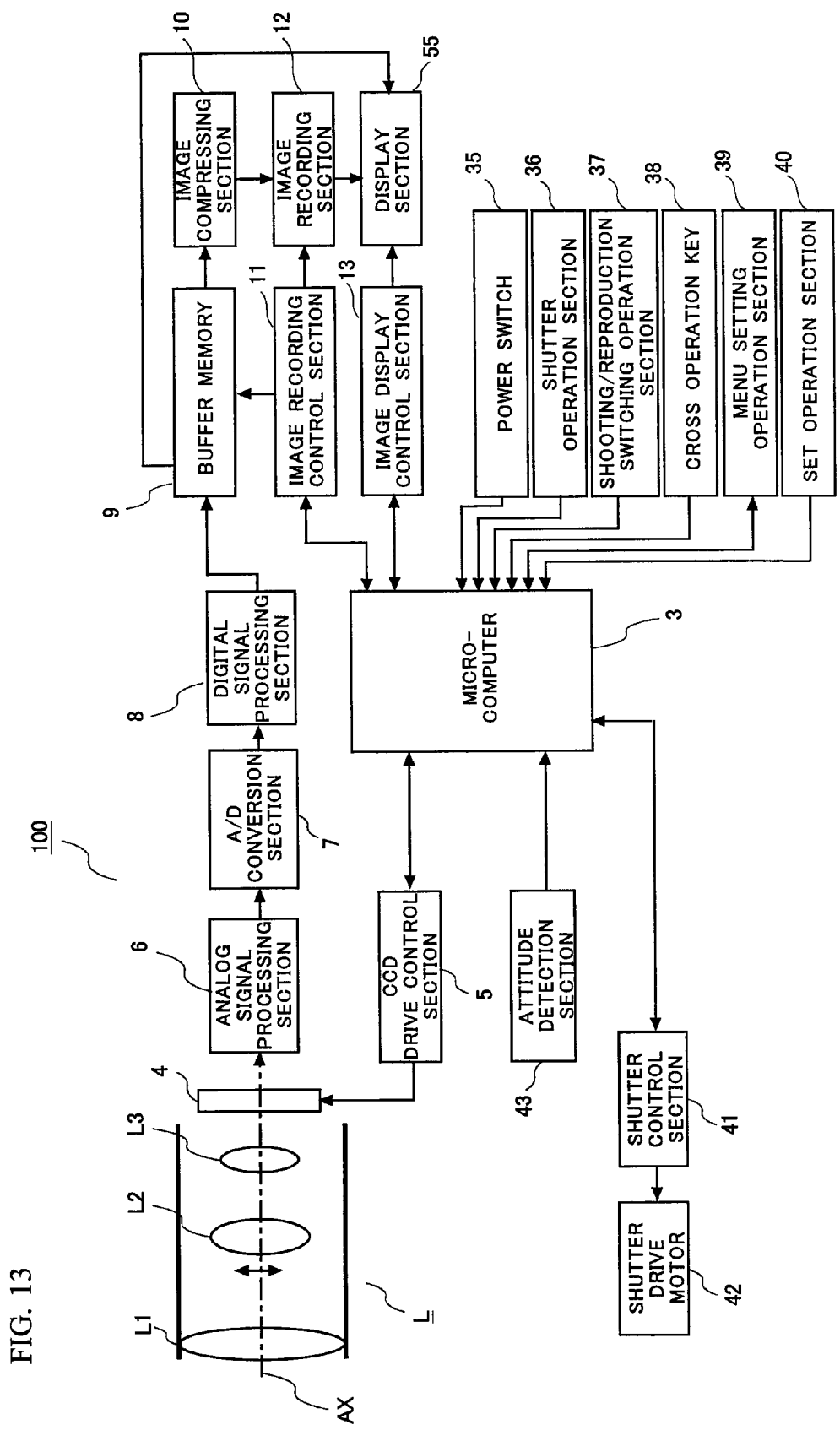
FIG. 13 is a block diagram showing a general configuration of a digital camera according to embodiment 2.

FIG. 13 is a block diagram showing a general configuration of a digital camera 100 according to embodiment 2. The digital camera 100 according to the present embodiment has almost the same configuration as the digital camera 1 according to the embodiment 1, however, is different in that the digital cameral 100 includes an attitude detection section 43 for detecting an attitude of the digital camera. Hereinafter, points different from embodiment 1 will be mainly described.

The attitude detection section 43 detects the attitude of the digital camera 100, and determines an orientation of a shot image. Currently, various attitude detection methods are suggested to detect the attitude of the digital camera 100. As an example disclosed in Patent document 1, a digital camera having a rotation detection section is suggested. As another example, a digital camera having an image blurring compensation section is suggested, the image blurring compensation section detecting a vibration applied to the digital camera, and driving a compensation lens of an imaging optical system in two directions which are perpendicular to an optical axis. The digital camera having the image blurring compensation section detects a drive signal outputted from the image blurring section to the compensation lens, and determines the attitude of the digital camera. The digital camera 100 according to the present embodiment may include the attitude detection section for detecting the attitude by using the above-described method. Without limiting to this, an angular velocity sensor or the like may be fixed to the digital camera. The above-described attitude detection methods are merely examples, and any configuration for detecting the attitude may be applicable instead of these methods.

Figures 14, 15:
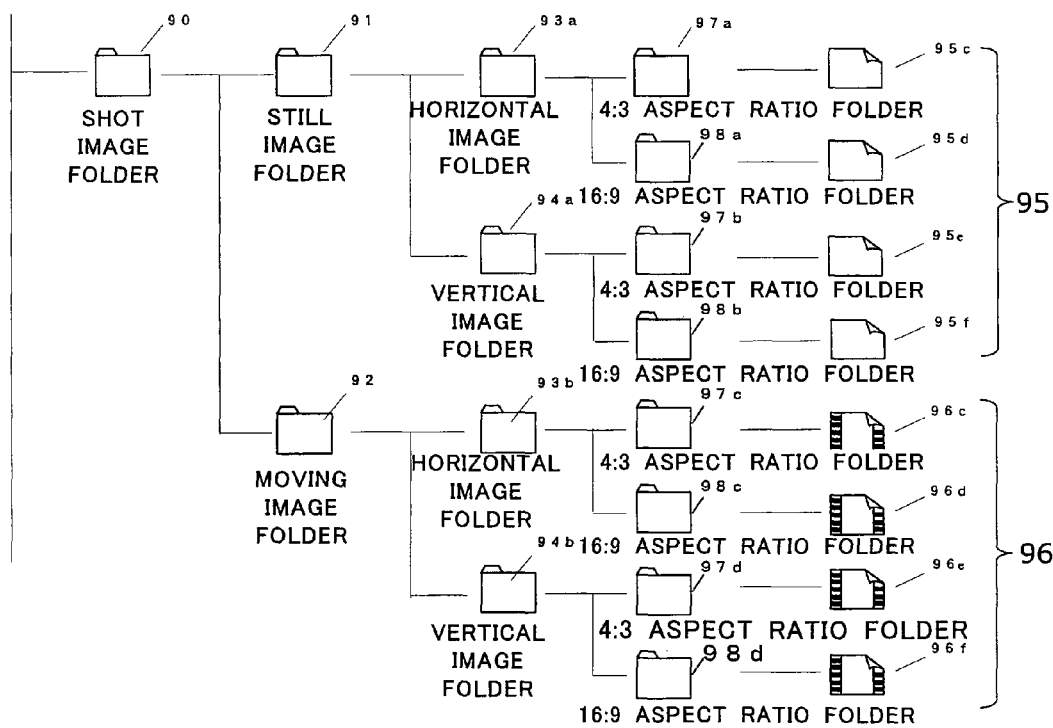
FIG. 14 is a diagram showing a relation between camera attitudes and attitude determination signals in embodiment 2.
FIG. 15 is a diagram showing an exemplary image folder created in an image recording section in embodiment 2.

Next, shooting processing performed by the digital camera 100 having the attitude detection section 43 will be described. In order to start shooting, the photographer turns the power switch 35 ON, and turns the shooting/reproduction switching operation section 37 to the shooting mode. Accordingly, the digital camera 100 turns into a shooting state. When the photographer holds the digital camera 100 in the horizontal shooting attitude, in order to shoot a horizontally oriented object such as a landscape in the horizontal shooting attitude, the microcomputer 3 recognizes in accordance with an output value from the attitude detection section 43 that the digital camera 100 is in the horizontal shooting attitude. When the photographer operates the shutter operation section 36, an optical image of the object formed on the imaging sensor 4 is converted into an image signal. After the conversion, the output image signal is subject to predetermined processing such as noise reduction and aspect ratio switching in the digital signal processing section 8, and then is recorded in the image recording section 12 via the buffer memory 9. The image recording control section 11 adds the attitude determination signal 60, which corresponds to the attitude of the camera, to the image signal. FIG. 14 is a diagram showing a relation between the attitudes of the camera and the attitude determination signals. As shown in FIG. 14, the image recording control section 11 adds an attitude determination signal 60(0) to the image signal shot in the horizontal shooting attitude, and records the image signal in the image recording section 12. The attitude determination signal 60 is added to a header portion or a footer portion of the image signal, for example.

On the other hand, when a vertically oriented object such as a person is shot in the vertical shooting attitude, the image recording control section 11 adds an attitude determination signal 60(1) indicative of the vertical shooting attitude to the image signal, and records the image signal in the image recording section 12. In this manner, in the digital camera 100 according to the present embodiment, when the image signal is to be recorded, the attitude determination signal 60 indicative of the shooting attitude is added to the image signal in addition to the aspect ratio determination signal 61.

The image display control section 13 controls an image to be displayed on the display section 55 in accordance with the attitude determination signal 60. That is, the image display control section 13 restores an orientation of the shot image so as to correspond to the attitude at the time of shooting, and cause the shot image to be displayed on the display section 55. Accordingly, the orientation of the shot image with the attitude determination signal 60(1) added thereto is rotated by 90 degrees, that is, the shot image is restored so as to correspond to the attitude at the time of the shooting, and then displayed.

Next, with reference to FIGS. 15 to 17, a managing method of an image file for recording the shot image will be described. The managing method of the image file in the present embodiment is almost the same as the managing method in embodiment 1, however, is different as shown in FIG. 15, in that folders 93a, 93b, 94a and 94b classified by shooting attitudes are created in hierarchies under the still image folder 91 and the moving image folder 92. Further, in the hierarchies under the folders 93a, 93b, 94a and 94b classified by the shooting attitudes, folders classified by the aspect ratios are created.

Shot images are sorted into either the still image folder or the moving image folder. The shot images are, thereafter, sorted into the folders 93a, 93b, 94a and 94b classified by the shooting attitudes, in accordance with the attitude determination signal 60, and then stored in the folders 97a, 97b, 97c, 97d, 98a, 98b, 98c and 98d classified by the aspect ratios, in accordance with the aspect ratio determination signal 61.

Figure 16:
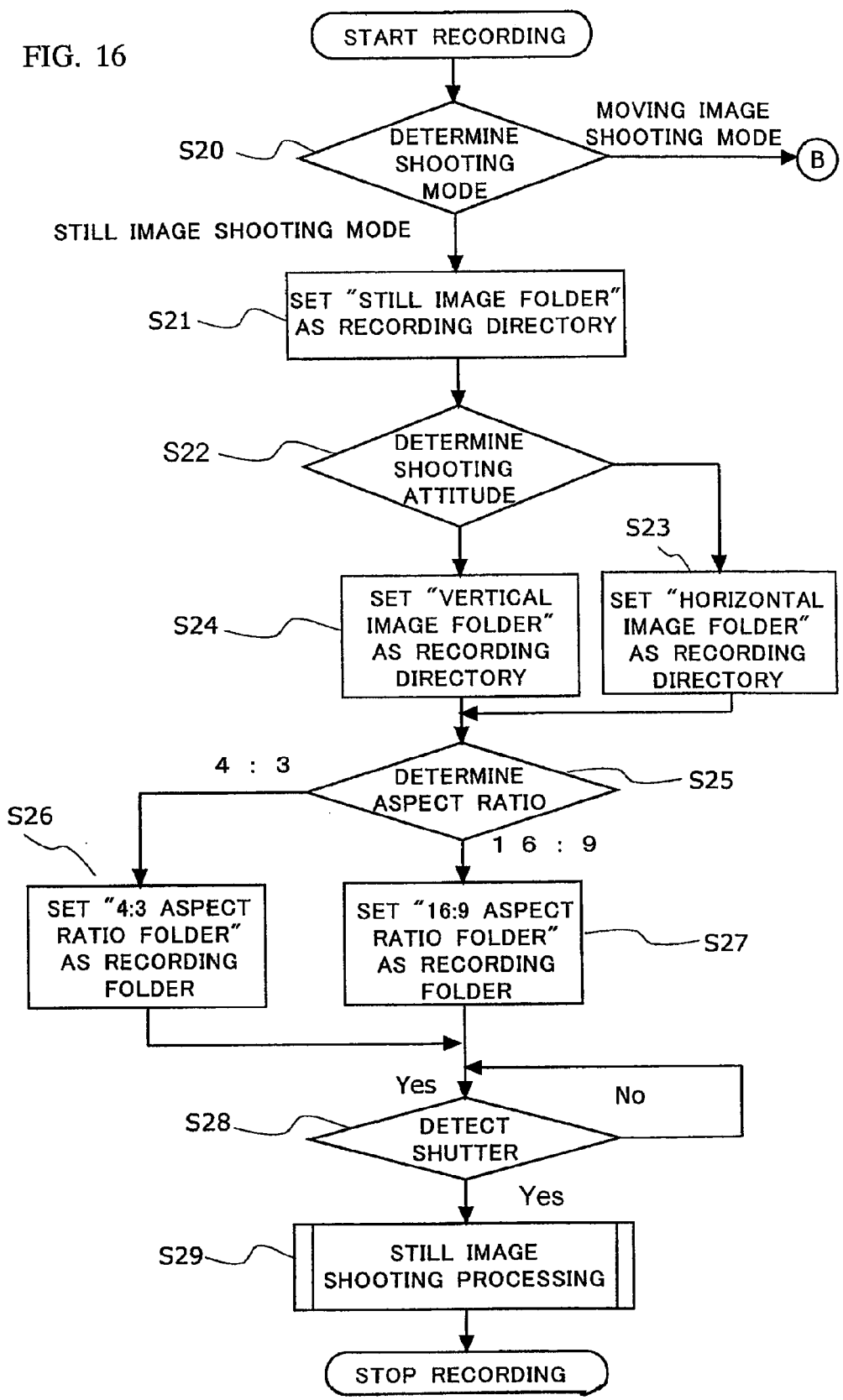
FIG. 16 is a flowchart from a start of recording to an end of the recording in embodiment 2.
Figure 17:
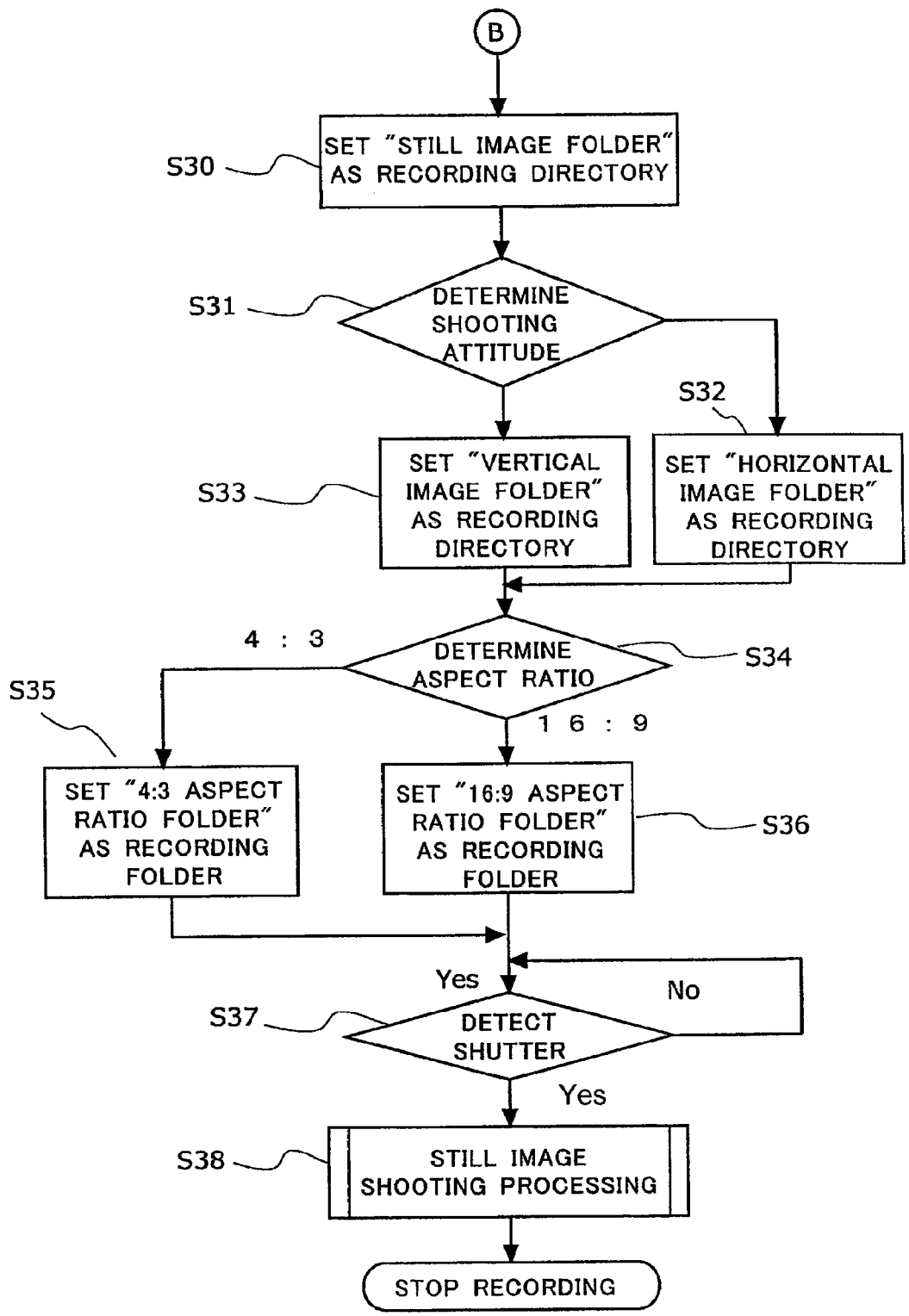
FIG. 17 is another flowchart from the start of recording and the end of the recording in embodiment 2.

FIGS. 16 and 17 are flowcharts showing recording processing of the shot image, from a start of recording to an end of the recording. The recording processing in the present embodiment is almost the same as the processing described in embodiment 1, and thus will be omitted here except for a part thereof. First, in Step 20, shooting mode determination processing is performed. That is, the microcomputer 3 determines whether the photographer selects the still image shooting mode or the moving image shooting mode. When the still image shooting mode is detected, the processing of the digital camera 1 proceeds to step S21, whereas when the moving image shooting mode is detected, the processing proceeds to processing B shown in FIG. 17.

When the still image shooting mode is detected, the image recording control section 11 sets, in step S21, the still image folder 91 as a recording directory of the shot image. Next, in step S22, the shooting attitude is determined. When the attitude determination signal 60(0) is added to the shot image, the shot image is determined to be in a horizontal shooting attitude, and thus the horizontal image folder 93a is set as the recording directory (Step S23). On the other hand, in the case of the attitude determination signal 60(1), the shot image is determined to be in the vertical shooting attitude, and thus the vertical image folder 94a is set as the recording directory (Step S24).

In subsequent Step S25, the aspect ratio determination processing is performed. The aspect ratio determination processing is the same as that in embodiment 1. That is, the microcomputer 3 sets one of the 4:3 aspect ratio folders 97a and 97b or one of the aspect ratio 16:9 folders 98a and 98b as the recording directory in accordance with the aspect ratio determination signal 61 added to the shot image (Step S26 and Step S27).

In subsequent step S28, an operation of the shutter operation section 36 performed by the photographer is received. When the pressing of the shutter operation section 36 is detected, the processing of the digital camera 100 proceeds to step S29, and the still image shooting processing is performed. When the still image shooting processing is completed, the shot image is stored in the set recording directory, and the recording processing ends.

On the other hand, in step S20, when the moving image shooting mode is detected, the processing B shown in FIG. 17 is performed. The processing B is the almost the same as the flowchart shown in FIG. 16. The moving image is stored in the set recording directory, and then the recording processing ends.

Figure 18:
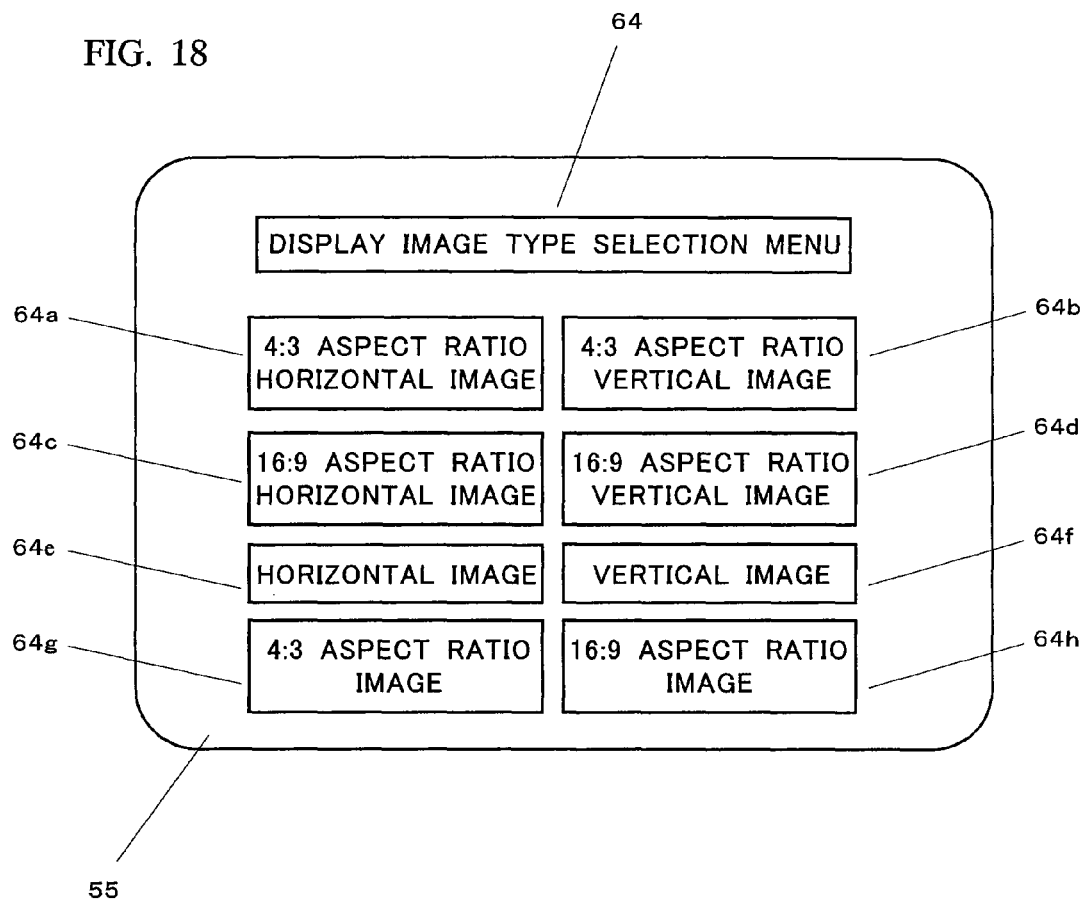
FIG. 18 is an example of a display image type selection menu displayed on a display section in embodiment 2.

Next, display processing of the images shot by the digital camera 100 will be described. In the digital camera 100 according to the present embodiment, images containing a common aspect ratio determination signal 61 or a common attitude determination signal 60 can be extracted and displayed on the display section 55. FIG. 18 is an example of a display image type selection menu 64 displayed on the display section 55. Types of the images are defined based on the aspect ratio determination signal 61 and/or the attitude determination signal 60 added to the image signal. For example, the types are classified in accordance with the aspect ratio and the shooting attitude at the time of shooting. In FIG. 18, the display image type selection menu 64 includes a 4:3 aspect ratio horizontal image selection button 64a, a 4:3 aspect ratio vertical image selection button 64b, a 16:9 aspect ratio horizontal image selection button 64c, a 16:9 aspect ratio vertical image selection button 64d, a horizontal image selection button 64e, a vertical image selection button 64f, a 4:3 aspect ratio selection button 64g, and a 16:9 aspect ratio selection button 64h.

When the photographer selects the 4:3 aspect ratio horizontal image selection button 64a from the display image type selection menu 64, the microcomputer 3 extracts images in the 4:3 aspect ratio folder 97a created in the hierarchy under the horizontal image folder 93*a*. The extracted images are displayed on the display section 55 in order of extraction. On the display section 55, the horizontal images each having the aspect ratio of 4:3 are displayed in the thumbnail form.

When the photographer selects the 4:3 aspect ratio vertical image selection button 64*b* from the display image type selection menu 64, the microcomputer 3 extracts images in the 4:3 aspect ratio folder 97*b* created in the hierarchy under the vertical image folder 94*a*. Further, the image display control section 13 rotates an orientation of each of the extracted images by 90 degrees such that the orientation corresponds to the attitude at the time of shooting, and then causes each of the extracted images to be displayed. Accordingly, on the display section 55, vertical shot images each having the aspect ratio of 4:3 are displayed in the thumbnail form.

In a similar manner, when the photographer selects the 16:9 aspect ratio horizontal image selection button 64*c* or the 16:9 aspect ratio vertical image selection button 64*d* from the display image type selection menu 64, the microcomputer 3 extracts images in the 16:9 aspect ratio folder 98*a* or 98*b*, and vertical images or horizontal images each having the aspect ratio of 16:9 are to be displayed on the display section 55 in the thumbnail form.

Further, to display horizontal images in the thumbnail form regardless of the aspect ratios, the photographer may select the horizontal image selection button 64*e*. The microcomputer 3 extracts images in the 4:3 aspect ratio folder 97*a* and in the 16:9 aspect ratio folder 98*a* which are created in the hierarchy under the horizontal image folder 93*a*, and only the horizontal images are displayed on the display section 55. In a similar manner, to display vertical images in the thumbnail form regardless of the aspect ratios, the photographer may select the vertical image selection button 64*f*.

To display images each having the aspect ratio of 4:3 in the thumbnail form regardless of the shooting attitudes, the photographer may select the 4:3 aspect ratio selection button 64*g*. The microcomputer 3 extracts shot image stored in the 4:3 aspect ratio folders 97*a* and 98*a*, and only the images each having the aspect ratio of 4:3 are displayed on the display section 55. In this case, the images shot in the vertical shooting attitude are each rotated by 90 degrees by the image display control section 13 and then displayed. In a similar manner, to display images each having the aspect ratio of 16:9 in the thumbnail form regardless of the shooting attitudes, the photographer may select 16:9 aspect ratio selection button 64*h*.

In this manner, it is possible to extract and display, on the display section, only the images having the common shooting attitude and having the common aspect ratio. Further, the images shot in the vertical shooting attitude are restored so as to correspond to the attitude at the time of the shooting. Therefore, an easily viewable thumbnail display can be realized.

Further, the digital camera 100 according to the present embodiment is capable of displaying the shot images by giving a priority to the display size of each of the shot images or the number of displayed shot images. In other words, when the priority is given to the number of displayed images, the digital camera is capable of displaying more thumbnail images on the display section 55. When the priority is given to the display size, each of the thumbnail images is displayed in a larger display size.

Figure 19:
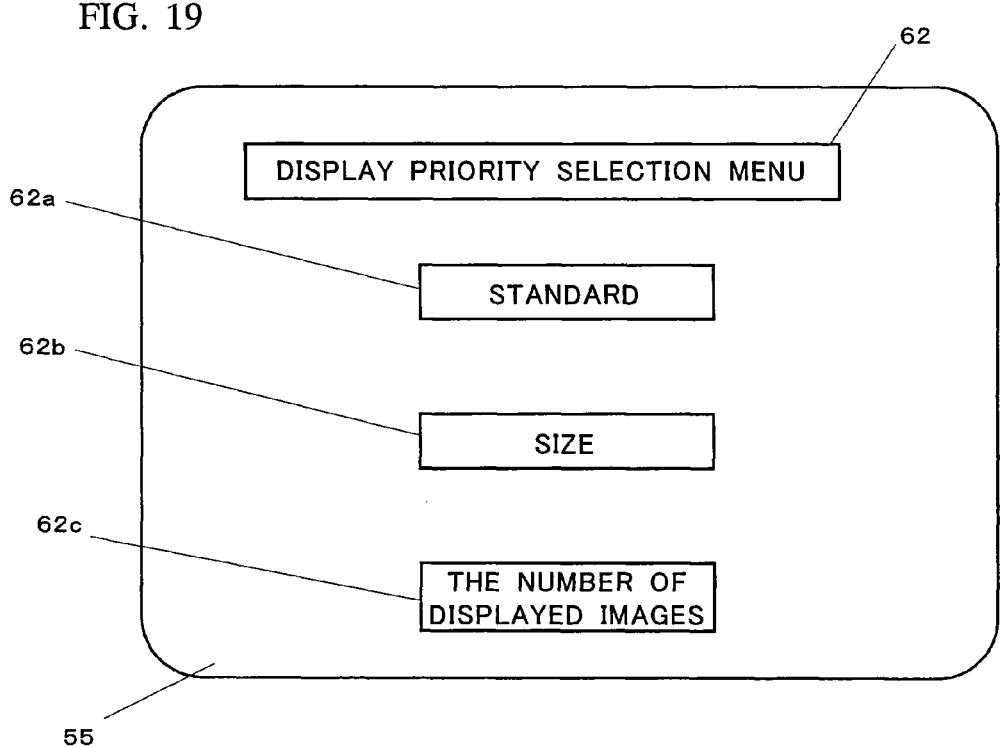
FIG. 19 is an example of a display priority selection menu displayed on the display section in embodiment 2.

FIG. 19 shows an example of the display priority selection menu 62 displayed on the display section 55. The display priority selection menu 62 includes a standard selection button 62*a*, a size priority button 62*b*, and a number-of-display-images priority button 62*c*. The photographer can select any one of the buttons.

First, the photographer selects, from the display image type selection menu 64 shown in FIG. 18, a type of images to be displayed on the display section. The photographer operates the MENU setting operation section 39 so as to display the display priority selection menu 62 on the display section 55, and selects a button. As examples, an exemplary display in which the priority is given to the display size, and an exemplary display in which the priority is given to the number of displayed images will be described in the case where the type of images is the horizontal image having the aspect ratio of 4:3.

Figure 20A:
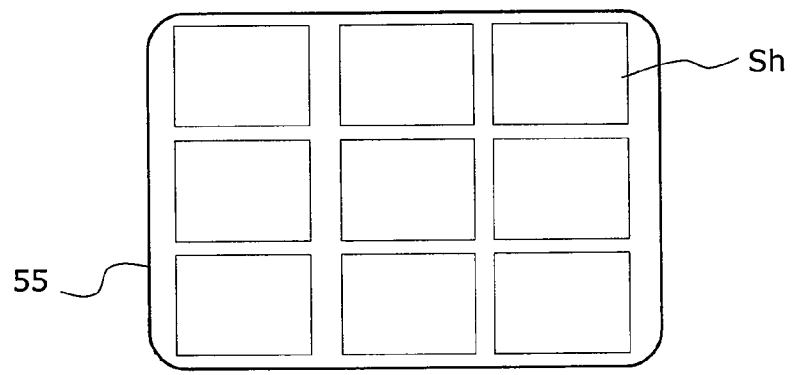
FIG. 20A is an exemplary thumbnail display in the case where a standard selection button is selected in embodiment 2.

In FIG. 19, when the photographer selects the standard selection button 62*a* from the display priority selection menu 62, the image display control section 13 causes a predetermined number of horizontal images Sh each having the aspect ratio of 4:3 to be displayed on the display section 55 in predetermined display sizes. FIG. 20A is an exemplary thumbnail display in the case where the standard selection button 62*a* is selected. As shown in FIG. 20A, a total of 9 horizontal images Sh each having the aspect ratio of 4:3, i.e., 3 images in the vertical direction by 3 images in the horizontal direction, are displayed on the display section 55. Hereinafter, a layout used for displaying the predetermined number of thumbnail images in the predetermined display sizes at predetermined display positions is referred to as a standard layout.

Figure 20B:
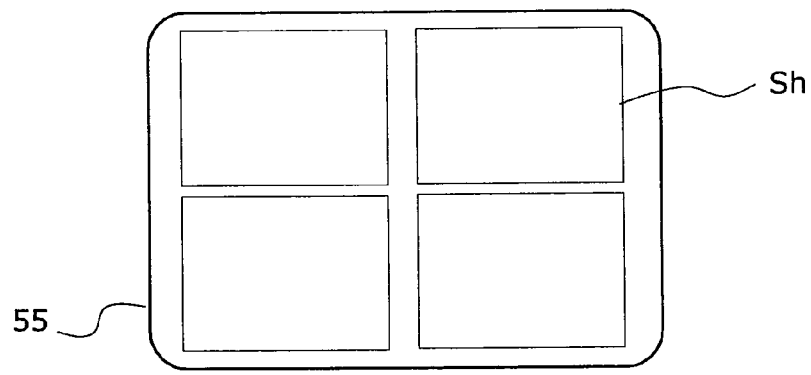
FIG. 20B is an exemplary thumbnail display in the case where a size priority button is selected in embodiment 2.

When the photographer selects the size priority button 62*b* from the display priority selection menu 62, the respective thumbnail images are displayed on the display section 55 while the priority is given to the display size of each of the thumbnail images. That is, the image display control section 13 displays each of the thumbnail images Sh in a larger display size compared with the standard layout. FIG. 20B shows an exemplary thumbnail display in the case where the size priority button 62*b* is selected. As shown in FIG. 20B, each of the thumbnail images Sh is displayed in a larger display size compared to a case of a display based on the standard layout. Accordingly, the photographer can easily check the images.

Figure 20C:
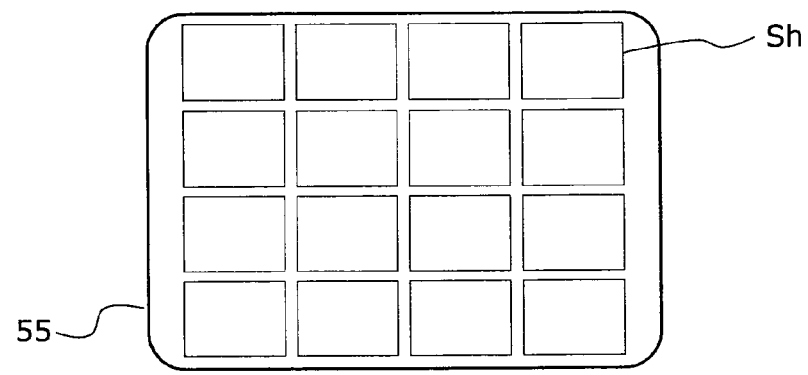
FIG. 20C is an exemplary thumbnail display in the case where a number-of-display-images priority button is selected.

When the photographer selects the number-of-display-images priority button 62*c* from the display priority selection menu 62, the thumbnail display is performed while the priority is given to the number of displayed images. That is, the image display control section 13 causes more thumbnail images to be displayed on the display section 55 compared to the standard layout. FIG. 20C shows an exemplary thumbnail display in the case where the number-of-display-images priority button 62*c* is selected. As shown in FIG. 20C, a total of 16 horizontal images Sh each having the aspect ratio of 4:3, i.e., 4 images in the vertical direction by 4 images in the horizontal direction, are displayed on the display section 55. In this manner, since the more thumbnail images can be displayed compared to the standard layout, the photographer can checks the more images at one time. FIGS. 20A to 20C exemplify the case where the horizontal images Sh each having the aspect ratio of 4:3 are displayed, however, similar display processing may be performed with respect to different types of images.

As above described, the digital camera according to the present embodiment records the attitude determination signal, as well as the aspect ratio determination signal, together with the image signal. Therefore, the shot image can be restored and displayed so as to correspond to the attitude at the time of the shooting. Further, the digital camera according to the present embodiment is capable of easily extracting the shot image based on the aspect ratio and a shooting attitude, and is capable displaying, in the thumbnail form, images having the common aspect ratio and having the common shooting attitude. Accordingly, images having different aspect ratios and different shooting attitudes are not displayed in a mixed manner, whereby an easily viewable thumbnail display can be realized.

Further, in the digital camera according to the present embodiment, it is possible to display the thumbnail images while the priority is given to the display size of each of the thumbnail images or the number of displayed thumbnail images. When the priority is given to the display size, the thumbnail images are displayed on the display section in a larger display size than the conventional display size, and thus a further improved viewability can be realized. When the priority is given to the number of displayed images, more thumbnail images than ever can be displayed. Therefore, the photographer can check more images at one time, whereby highly convenient digital camera can be provided.

The present embodiment is exemplified by a case where the display image type selection menu 64 for selecting the type of the images includes the aspect ratio selection menu 65 according to embodiment 1, but is not limited thereto. For example, the menu screen for selecting the type of the images may be divided into a selection screen based on the shooting attitude and a selection screen based on the aspect ratio, and as an exemplary configuration, the aspect ratio may be selected after a desired shooting attitude is selected.

In the present embodiment, the image recording section includes the folders which are classified by the aspect ratios and are created in the hierarchies under the folders classified by the shooting attitudes, but is not limited thereto. The folders classified by the shooting attitudes may be created in the hierarchies under the folders classified by the aspect ratios. Alternatively, the folders classified by the shooting attitudes may be created in the same hierarchies as the folders classified by the aspect ratios.

The present embodiment is exemplified by a case where the photographer selects the type of the images in the display image type selection menu 64, and then selects the priority in the display priority selection menu 62, but is not limited thereto. A configuration may be applicable in which the priority is selected in the display priority selection menu 62, and then the type of the images is selected in the display image type selection menu 64.

As shown in FIGS. 16 and 17, the digital camera according to the present embodiment determines the folder to store the image signal before shooting, but is not limited thereto. For example, the folder to store the image signal may be determined after the shooting in accordance with the aspect ratio determination signal and the attitude determination signal, or the folder may be set by a user after the shooting.

(Embodiment 3)

Figure 21:
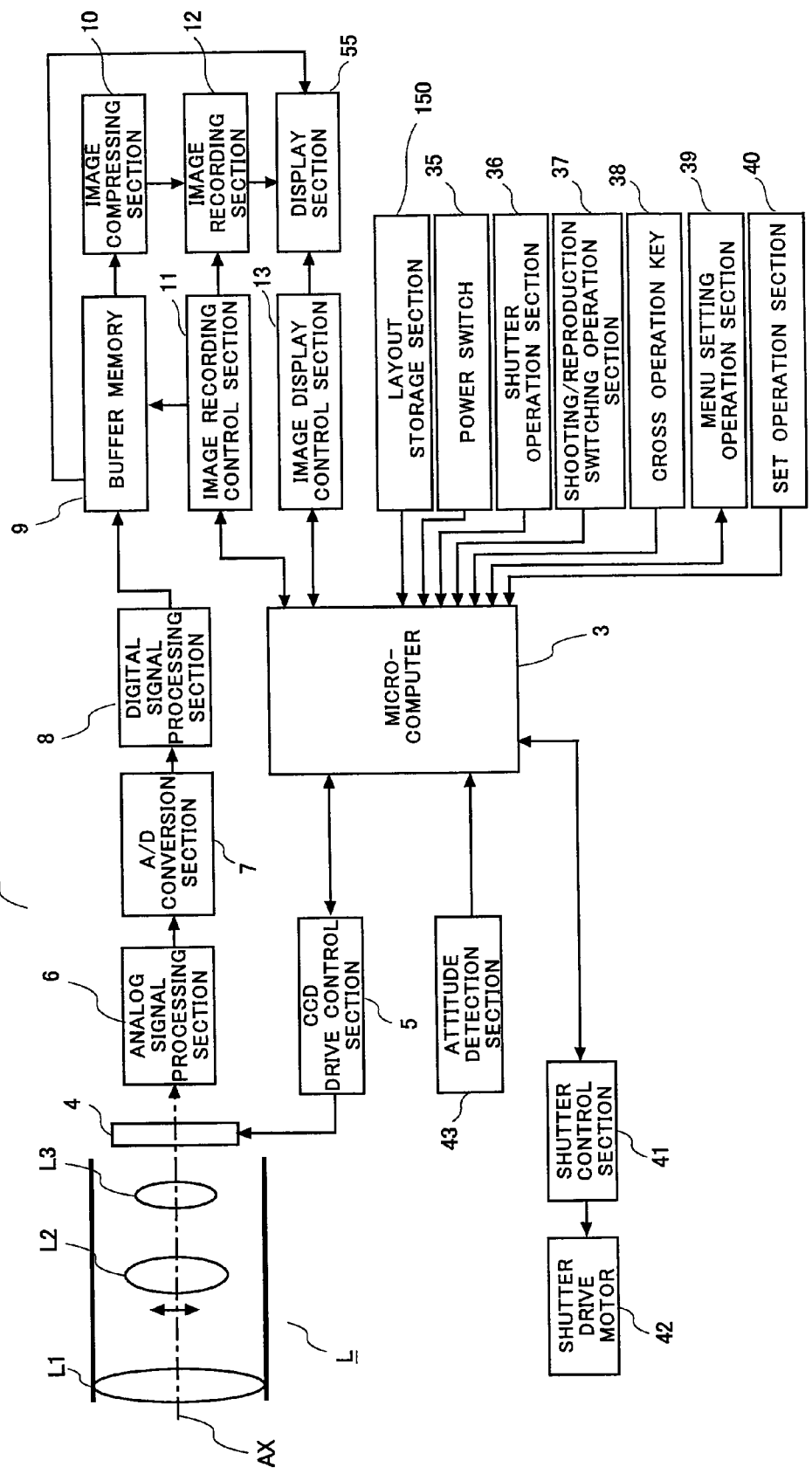
FIG. 21 is a block diagram showing a general configuration of a digital camera according to embodiment 3.

FIG. 21 is a block diagram showing a general configuration of a digital camera 200 according to embodiment 3. The digital camera 200 has almost the same configuration as the digital cameras according to embodiments 1 and 2, but is different in that the digital camera 200 has a layout storage section 150. Hereinafter, points which are different from embodiments 1 and 2 will be mainly described.

The layout storage section 150 stores therein a layout which indicates display positions and display sizes of respective thumbnail images on the display section 55, and the number of displayed thumbnail images. In the present embodiment, a plurality of layouts is stored in the layout storage section 150. In accordance with a type of an image and/or a priority, the display positions, the number of displayed images, and the display sizes on the display section 55 are changed, and the images are displayed in a thumbnail form. As above described, the type of the images is determined in accordance with the aspect ratio determination signal 61 and with the attitude determination signal 60 added to respective image signals, and the images are classified by the aspect ratios and the shooting attitudes at the time of shooting. The priority is determined based on, for example, the display sizes of the thumbnail images and the number of displayed thumbnail images, and is set by the photographer through the display priority selection menu 62 shown in FIG. 19.

The image display control section 13 extracts a predetermined layout from the layout storage section 150 in accordance with the type and the priority of the images selected by the photographer, and causes respective thumbnail images to be displayed in accordance with the extracted layout. The photographer may select a desired layout by operating the MENU setting operation section 39, the cross operation key 38 and the SET operation section 40.

Next, the layouts stored in the layout storage section 150 will be described. FIGS. 22A to 27E each shows an exemplary layout used in the case where types of images, such as a shooting attitude, an aspect ratio, or the like, are identical to one another. An exemplary layout for displaying horizontal images having the aspect ratio of 4:3 in the thumbnail form is the same as that shown in FIG. 20, and thus description thereof will be omitted.

Figure 22A:
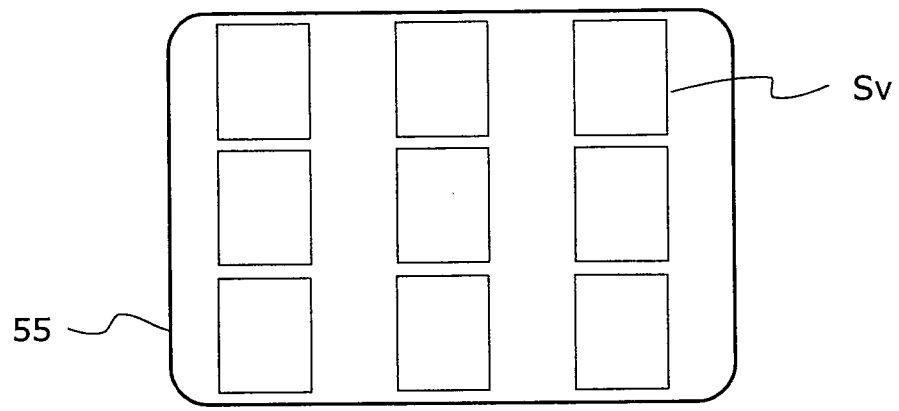
FIG. 22A is an exemplary layout for displaying vertical images each having an aspect ratio of 4:3 in a thumbnail form in embodiment 3.
Figure 22B:
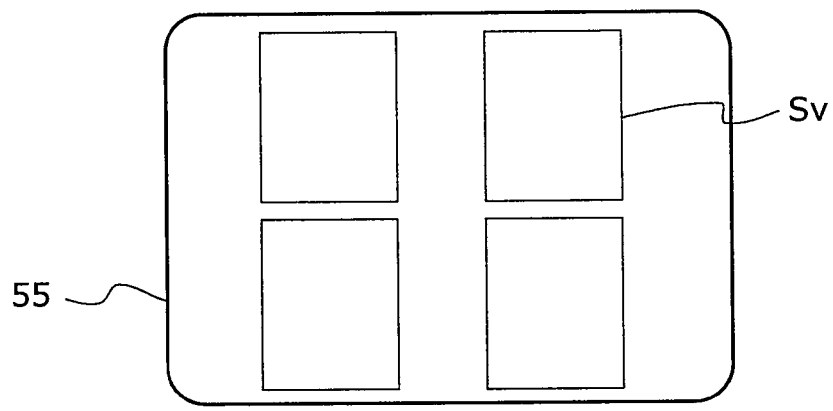
FIG. 22B is another exemplary layout for displaying the vertical images each having the aspect ratio of 4:3 in the thumbnail form in embodiment 3.
Figure 22C:
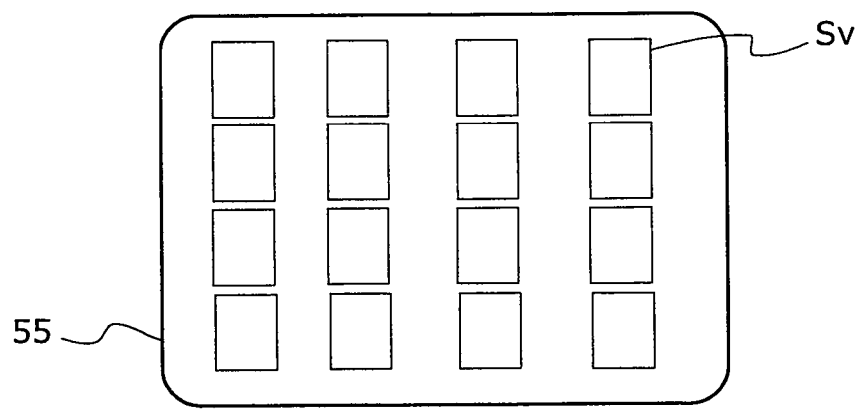
FIG. 22C is another exemplary layout for displaying the vertical images each having the aspect ratio of 4:3 in the thumbnail form in embodiment 3.

FIGS. 22A to 22C each shows an exemplary layout for displaying vertical images having the aspect ratio of 4:3 in the thumbnail form. FIG. 22A shows a standard layout, FIG. 22B shows a display size priority layout, and FIG. 22C shows a number-of-display-images priority layout. When the photographer selects the standard selection button 62a from the display priority selection menu shown in FIG. 18, the image display control section 13 extracts the standard layout shown in FIG. 22A from the layout storage section 150, and causes vertical images Sv each having the aspect ratio of 4:3 to be displayed in accordance with the extracted layout. Accordingly, on the display section 55, a total of 9 vertical images Sv each having the aspect ratio of 4:3, i.e., 3 images in the vertical direction by 3 images in the horizontal direction, are displayed. On the other hand, when the photographer selects the size priority button 62b from the display priority selection menu, the image display control section 13 causes the vertical images Sv to be displayed in accordance with the display size priority layout shown in FIG. 22B. Accordingly, each of the vertical images Sv is displayed on the display section 55 in a larger display size compared to the standard layout (FIG. 22A). When the photographer selects the number-of-display-images priority button 62c, the image display control section 13 causes the vertical images Sv to be displayed in accordance with the number-of-display-images priority layout shown in FIG. 22C. Accordingly, on the display section 55, a more number of thumbnail images are displayed compared to that in the standard layout (FIG. 22A).

Figure 23A:
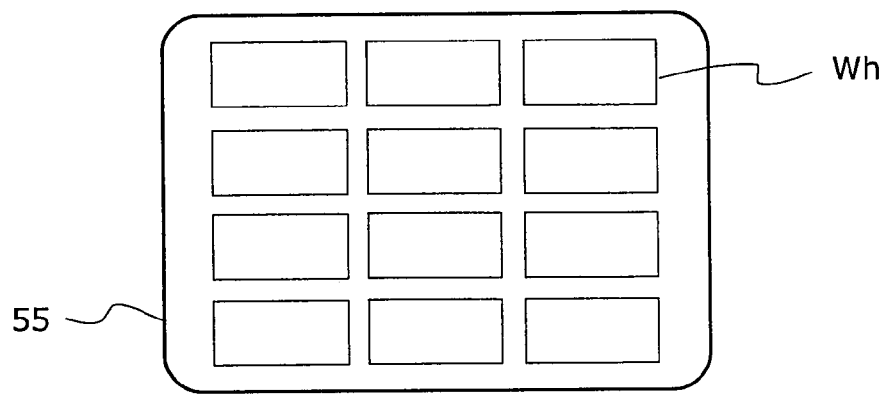
FIG. 23A is an exemplary layout for displaying horizontal images each having an aspect ratio of 16:9 in the thumbnail form in embodiment 3.
Figure 23B:
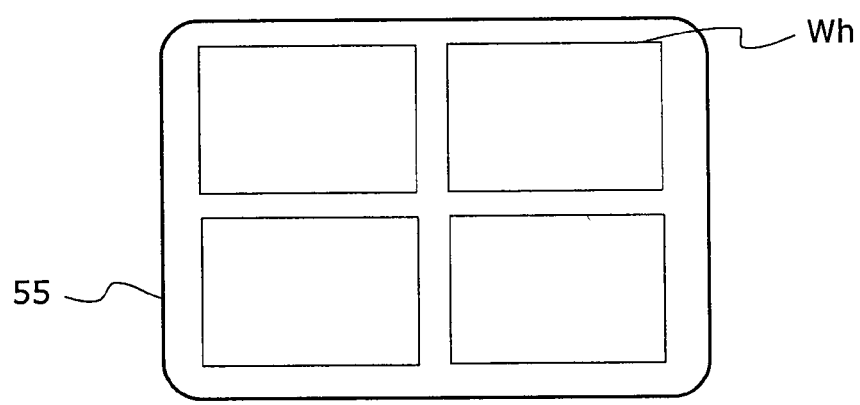
FIG. 23B is another exemplary layout for displaying the horizontal image each having the aspect ratio of 16:9 in the thumbnail form in embodiment 3.
Figure 23C:
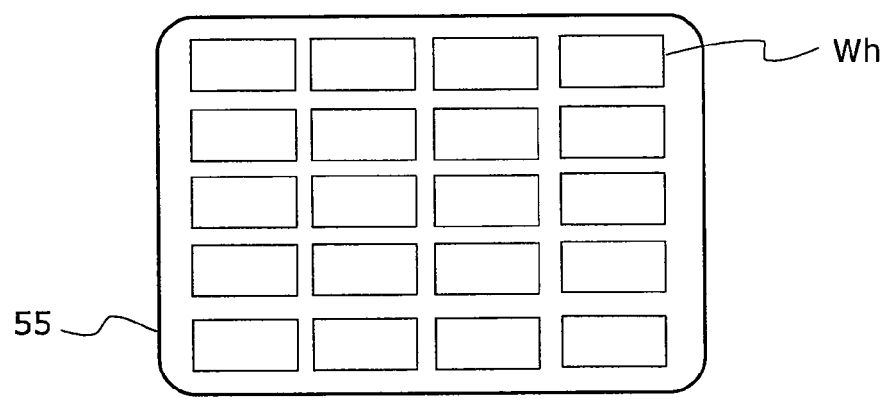
FIG. 23C is another exemplary layout for displaying the horizontal images each having the aspect ratio of 16:9 in the thumbnail form in embodiment 3.

FIGS. 23A to 23C each shows an exemplary layout for displaying horizontal images each having the aspect ratio of 16:9 in the thumbnail form. FIG. 23A shows the standard layout, FIG. 23B shows the display size priority layout, and FIG. 23C shows the number-of-display-images priority layout. As is clear from the standard layout shown in FIG. 23A, a length of a short side of the horizontal image Wh having the aspect ratio of 16:9 is shorter than a length of a short side of a horizontal image having the aspect ratio of 4:3. Therefore, on the display section 55, a total of 12 horizontal images Wh, i.e., 4 images in the vertical direction by 3 images in the horizontal direction, are displayed. Accordingly, it is possible to realize a thumbnail display in which a display area on the display section 55 is used effectively. As shown in FIGS. 23B and 23C, the layout used when the priority is given to the display size or the number of display sheets can also realize the thumbnail display in which the display area on the display section 55 is used effectively.

Figure 24A:
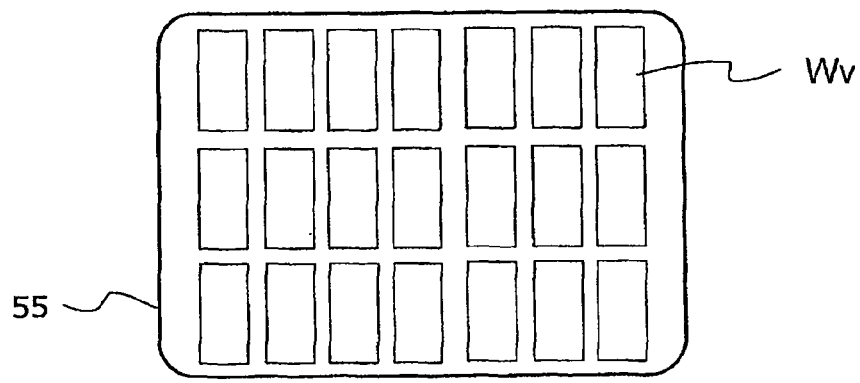
FIG. 24A is an exemplary layout for displaying vertical images each having the aspect ratio of 16:9 in the thumbnail form in embodiment 3.
Figure 24B:
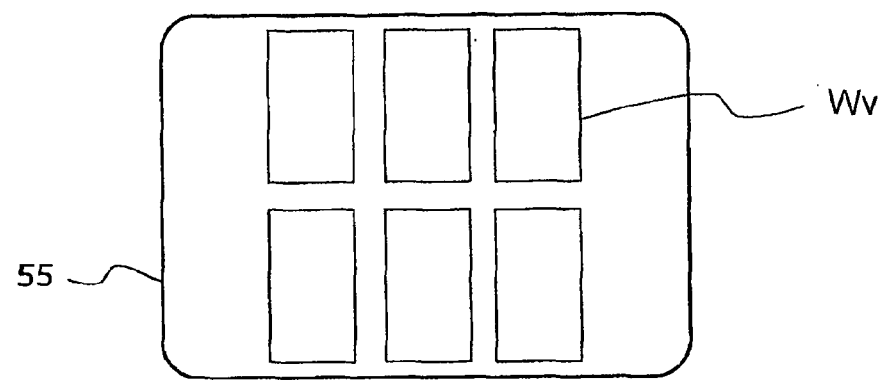
FIG. 24B is another exemplary layout for displaying the vertical images each having the aspect ratio of 16:9 in the thumbnail form in embodiment 3.
Figure 24C:
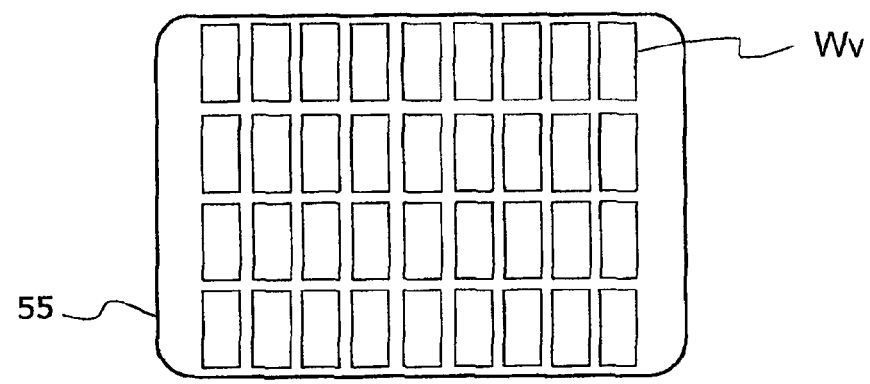
FIG. 24C is another exemplary layout for displaying the vertical images each having the aspect ratio of 16:9 in the thumbnail form in embodiment 3.

FIG. 24A to 24C each shows an exemplary layout for displaying vertical images each having the aspect ratio of 16:9 in the thumbnail form. FIG. 24A shows the standard layout, FIG. 24B shows the display size priority layout, and FIG. 24C shows the number-of-display-images priority layout. As is indicated by the standard layout shown in FIG. 24A, the image display control section 13 causes an orientation of each of the images to be rotated by degrees in accordance with the attitude determination signal 60(1) and causes the thumbnail images to be displayed. As is clear from the standard layout shown in FIG. 24A, a length of a short side of a vertical image Wv having the aspect ratio of 16:9 is shorter than a length of a short side of a vertical image Sv having the aspect ratio of 4:3. Therefore, a total of 21 vertical images Wv, i.e., 3 images in the vertical direction by 7 images in the horizontal direction, are displayed on the display section 55. Accordingly, it is possible to realize the thumbnail display in which the display area on the display section 55 is used effectively. As shown in FIGS. 24B and 24C, the layout used when the priority is given to the display size or the number of display sheets can also realize the thumbnail display in which the display area on the display section 55 is used effectively.

Figure 25A:
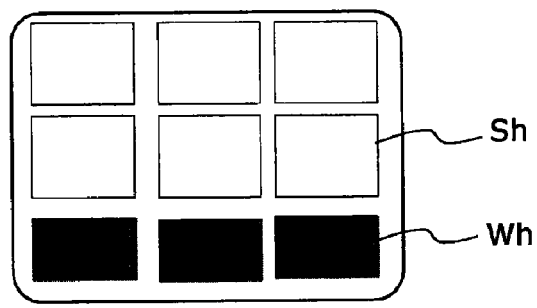
FIG. 25A is an exemplary layout for displaying horizontal images in the thumbnail form regardless of aspect ratios thereof in embodiment 3.
Figure 25B:
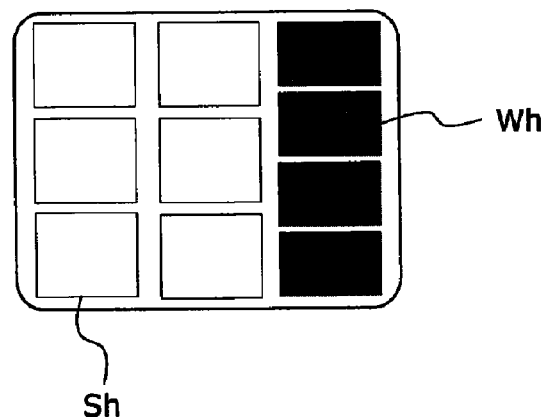
FIG. 25B is another exemplary layout for displaying the horizontal images in the thumbnail form regardless of the aspect ratios thereof in embodiment 3.
Figure 25C:
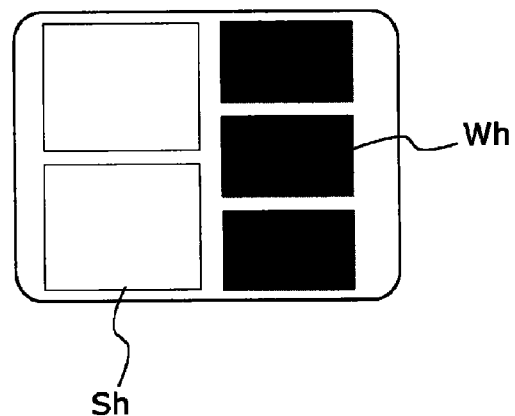
FIG. 25C is another exemplary layout for displaying the horizontal images in the thumbnail form regardless of the aspect ratios thereof in embodiment 3.

FIGS. 25A to 25C each shows an exemplary layout for displaying horizontal image in the thumbnail form regardless of the aspect ratios. As shown in each of the diagrams, on the display section 55, horizontal images Sh each having the aspect ratio of 4:3 and horizontal images Wh each having the aspect ratio of 16:9 are displayed in a mixed manner. FIGS. 25A and 25B each shows the standard layout, and FIG. 25C shows the display size priority layout. As shown in FIGS. 25A to 25C, in the case where images having various aspect ratios are displayed in the mixed manner, the images having common aspect ratios are arranged and displayed in a cluster.

Figure 26A:
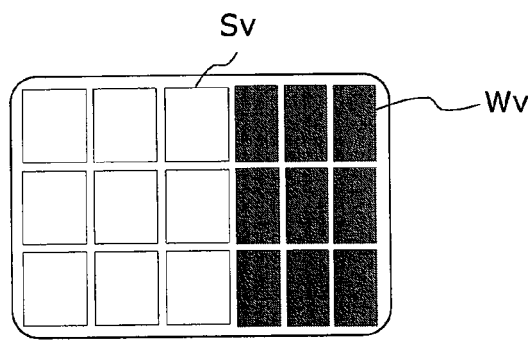
FIG. 26A is an exemplary layout for displaying vertical images in the thumbnail form in embodiment 3.
Figure 26B:
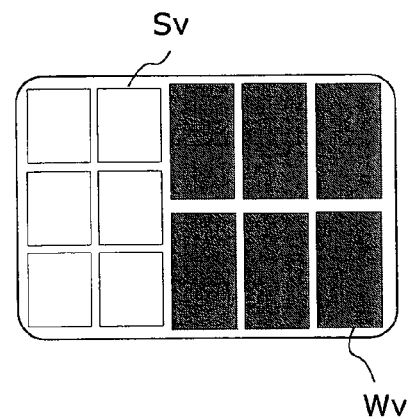
FIG. 26B is another exemplary layout for displaying the vertical images in the thumbnail form in embodiment 3.
Figure 26C:
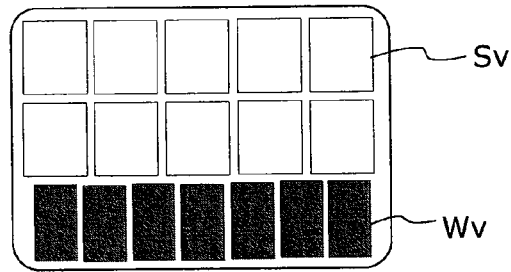
FIG. 26C is another exemplary layout for displaying the vertical images in the thumbnail form in embodiment 3.
Figure 26D:
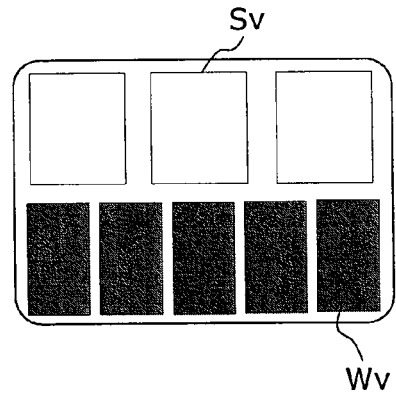
FIG. 26D is another exemplary layout for displaying the vertical images in the thumbnail form in embodiment 3.

In a similar manner, in the case where vertical images are displayed in the thumbnail form regardless of the aspect ratios, images having common aspect ratios are arranged and displayed in a cluster. As above described, images shot in the vertical shooting attitude are displayed as the vertical images after the orientation of each of the images are rotated by 90 degrees by the image display control section 13. FIGS. 26A to 26D each shows an exemplary layout for displaying vertical images in the thumbnail form. FIGS. 26A to 26C each shows an exemplary standard layout, and FIG. 26D shows an exemplary display size priority layout. As shown in FIGS. 25A to 25C and 26A to 26D, even in the case where the images having various aspect ratios are displayed in the mixed manner, the images having the common aspect ratios are arranged in a cluster. Therefore, unnecessary space between the images can be eliminated, and accordingly, an easily viewable thumbnail display can be realized.

Figure 27A:
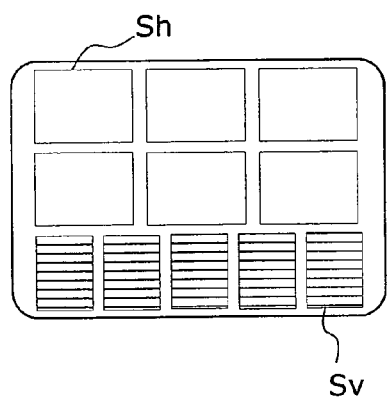
FIG. 27A is an exemplary layout for displaying images each having the aspect ratio of 4:3 in the thumbnail form regardless of shooting attitudes thereof in embodiment 3.
Figure 27B:
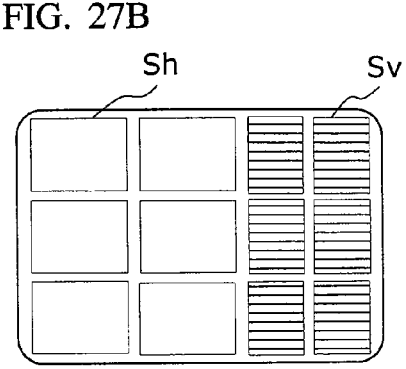
FIG. 27B is another exemplary layout for displaying the images each having the aspect ratio of 4:3 in the thumbnail form regardless of the shooting attitudes thereof in embodiment 3.
Figure 27C:
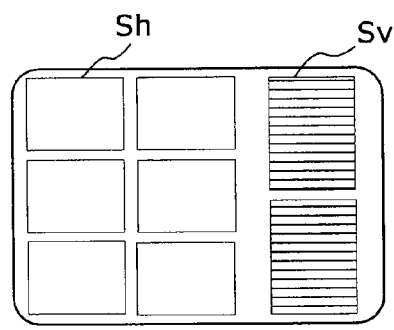
FIG. 27C is another exemplary layout for displaying the images each having the aspect ratio of 4:3 in the thumbnail form regardless of the shooting attitudes thereof in embodiment 3.
Figure 27D:
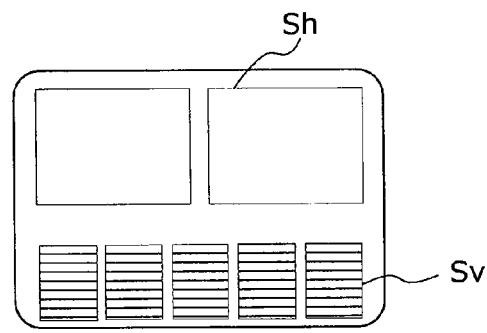
FIG. 27D is another exemplary layout for displaying the images each having the aspect ratio of 4:3 in the thumbnail form regardless of the shooting attitudes thereof in embodiment 3.
Figure 27E:
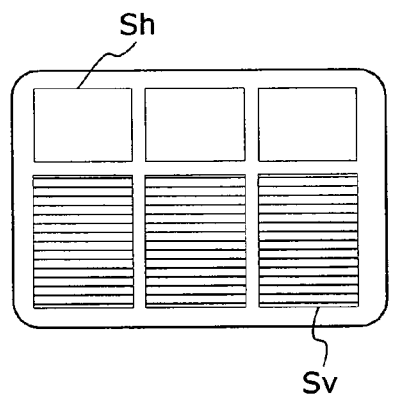
FIG. 27E is another exemplary layout for displaying the images each having the aspect ratio of 4:3 in the thumbnail form regardless of the shooting attitudes thereof in embodiment 3.
Figure 28A:
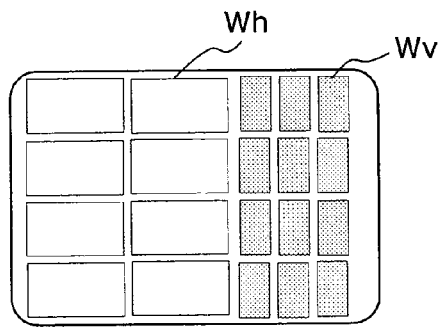
FIG. 28A is an exemplary layout for displaying images each having the aspect ratio of 16:9 in the thumbnail form regardless of shooting attitudes thereof in embodiment 3.
Figure 28B:
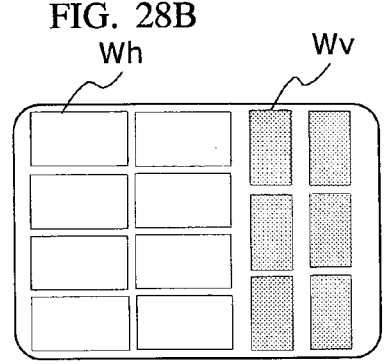
FIG. 28B is another exemplary layout for displaying the images each having the aspect ratio of 16:9 in the thumbnail form regardless of the shooting attitudes thereof in embodiment 3.
Figure 28C:
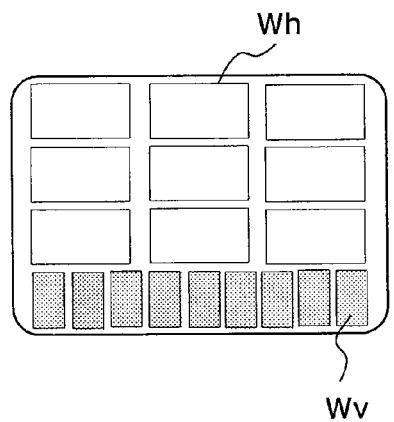
FIG. 28C is another exemplary layout for displaying the images each having the aspect ratio of 16:9 in the thumbnail form regardless of the shooting attitudes thereof in embodiment 3.
Figure 28D:
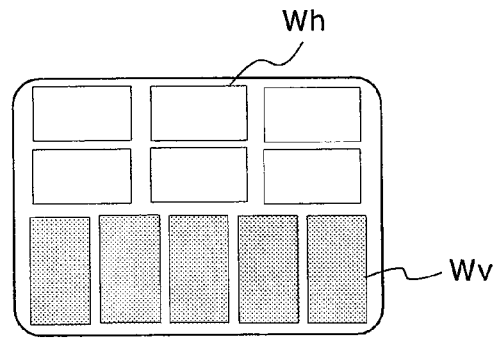
FIG. 28D is another exemplary layout for displaying the images each having the aspect ratio of 16:9 in the thumbnail form regardless of the shooting attitudes thereof in embodiment 3.
Figure 28E:
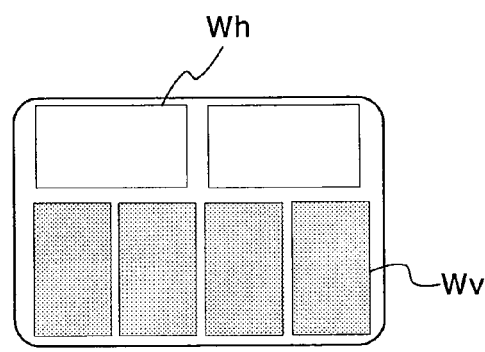
FIG. 28E is another exemplary layout for displaying the images each having the aspect ratio of 16:9 in the thumbnail form regardless of the shooting attitudes thereof in embodiment 3.
Figure 29A:
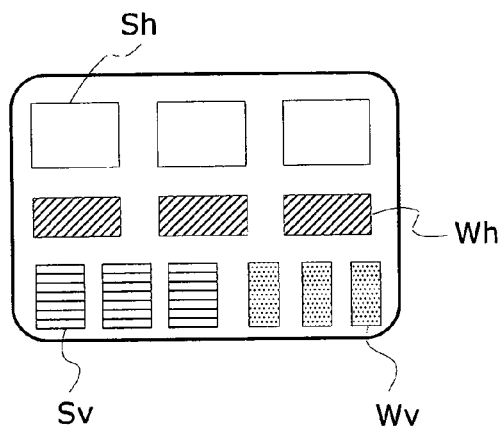
FIG. 29A is an exemplary layout for displaying all images recorded in an image recording section in the thumbnail form regardless of orientations and aspect ratios thereof in embodiment 3.
Figure 29B:
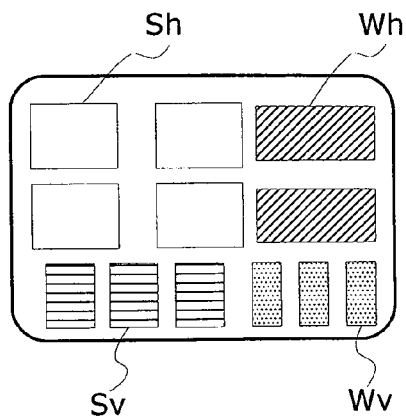
FIG. 29B is another exemplary layout for displaying all the images recorded in the image recording section in the thumbnail form regardless of the orientations and the aspect ratios thereof in embodiment 3.
Figure 29C:
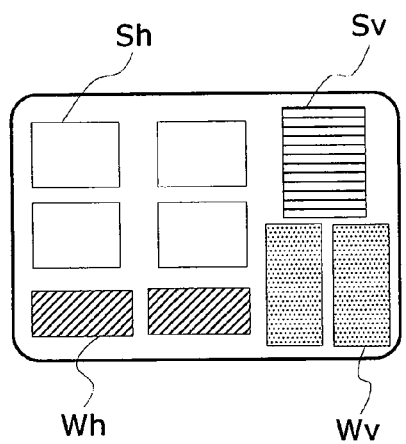
FIG. 29C is another exemplary layout for displaying all the images recorded in the image recording section in the thumbnail form regardless of the orientations and the aspect ratios thereof in embodiment 3.
Figure 29D:
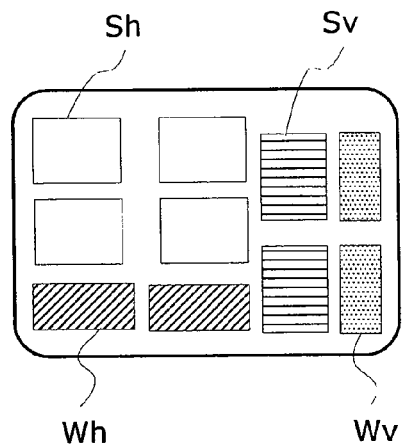
FIG. 29D is another exemplary layout for displaying all the images recorded in the image recording section in the thumbnail form regardless of the orientations and the aspect ratios thereof in embodiment 3.
Figure 29E:
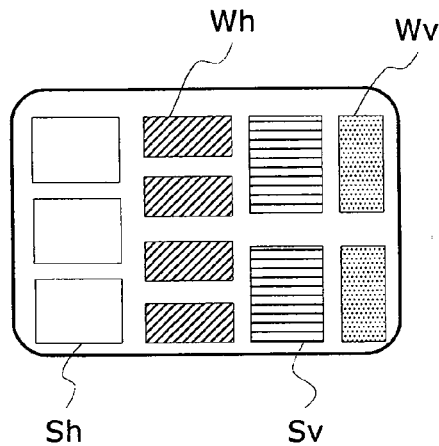
FIG. 29E is another exemplary layout for displaying all the images recorded in the image recording section in the thumbnail form regardless of the orientations and the aspect ratios thereof in embodiment 3.
Figure 30A:
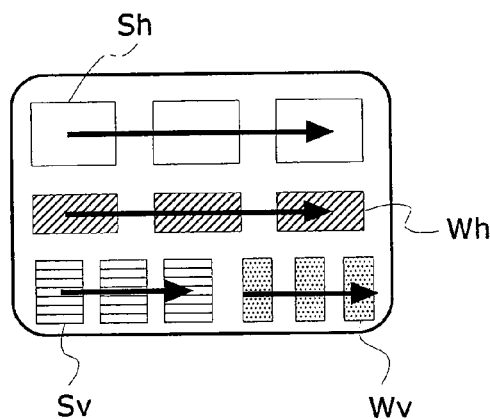
FIG. 30A is a diagram illustrating a display order of images by using the exemplary layout shown in FIGS. 29A to 29E in embodiment 3.
Figure 30B:
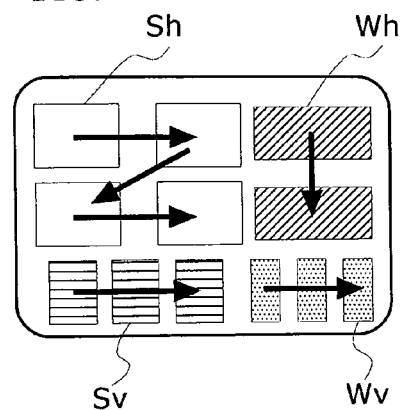
FIG. 30B is another diagram illustrating the display order of images by using the exemplary layout shown in FIGS. 29A to 29E in embodiment 3.
Figure 30C:
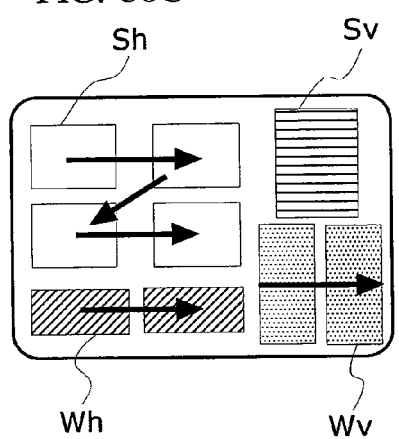
FIG. 30C is another diagram illustrating the display order of images by using the exemplary layout shown in FIGS. 29A to 29E in embodiment 3.
Figure 30D:
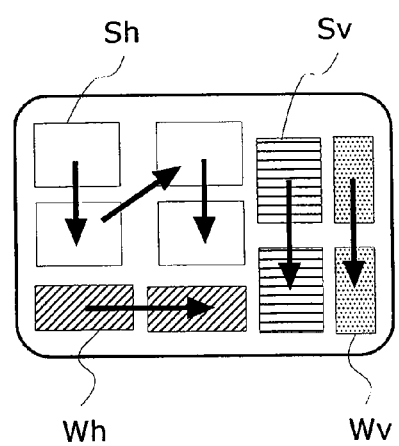
FIG. 30D is another diagram illustrating the display order of images by using the exemplary layout shown in FIGS. 29A to 29E in embodiment 3.
Figure 30E:
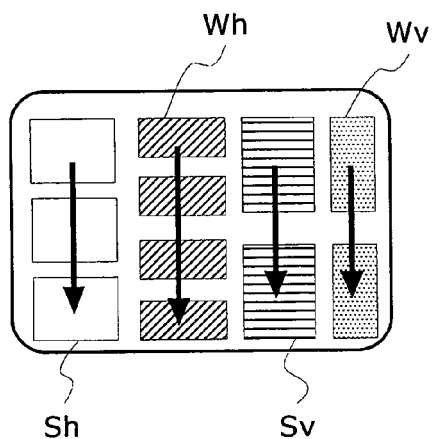
FIG. 30E is another diagram illustrating the display order of images by using the exemplary layout shown in FIGS. 29A to 29E in embodiment 3.

FIGS. 27A to 27E each shows an exemplary layout for displaying images each having the aspect ratio of 4:3 in the thumbnail form regardless of the shooting attitudes. As shown in each of the diagrams, the horizontal images Sh and the vertical images Sv each having the aspect ratio of 4:3 are displayed on the display section 55 in the mixed manner. FIGS. 27A to 27C each shows an exemplary standard layout, whereas FIGS. 27D and 27E each shows an exemplary display size priority layout. As shown in FIGS. 27A to 27E, in the case where the horizontal images and the vertical images are displayed in the mixed manner, images shot in common shooting attitudes are arranged and displayed in a cluster. Images shot in the vertical shooting attitude are displayed as the vertical images after the orientation of each of the images are rotated by 90 degrees by the image display control section 13. In a similar manner, FIGS. 28A to 28E each shows an exemplary layout for displaying images having the aspect ratio of 16:9 in the thumbnail form regardless of the shooting attitudes. FIGS. 28A to 28C each shows an exemplary standard layout, whereas FIGS. 28D and 28E each shows an exemplary display size priority layout. As shown in FIGS. 27A to 27E and 28A to 28E, even in the case where the horizontal images and the vertical images are displayed in the mixed manner, the horizontal images and the vertical images are respectively arranged in clusters, whereby unnecessary space between the images can be eliminated, and accordingly, the easily viewable thumbnail display can be realized.

Further, FIGS. 29A to 29E each shows an exemplary layout for displaying all images recorded in the image recording section 12 in the thumbnail form regardless of the shooting attitudes and the aspect ratios. As shown in FIGS. 29A to 29E, respective thumbnail images are displayed such that images having the common aspect ratios and the common shooting attitudes are arranged in a cluster. Accordingly, unnecessary space among the images can be eliminated, and thus the easily viewable thumbnail display can be realized.

As to a display order of the respective thumbnail images, for example, images may be displayed in chronological order of a date and time of shooting per each type of the images. FIGS. 30A to 30E are diagrams for explaining the display order of the images based on the exemplary layout shown in each of FIGS. 29A to 29E. As shown in each of the diagrams, the thumbnail images are displayed, from a left side to a right side of the display section 55, in chronological order of the date and time of shooting per each type of the images, along directions indicated by arrows as shown.

As above described, the digital camera according to the present embodiment has the layout storage section for storing therein the plurality of layouts. Therefore, in accordance with the aspect ratios and the shooting attitudes at the time of shooting of the images, the display position and the display size of each of the thumbnail images, and the number of displayed thumbnail images are changed. Accordingly, the easily viewable thumbnail display can be realized.

Further, the digital camera according to the present embodiment is capable of displaying the respective thumbnail images while the priority is given to the display size or the number of displayed images. When the priority is given to the display size, each of the thumbnail images is displayed in a larger display size. Therefore, the photographer can easily check the images. When the priority is given to the number of display sheets, many thumbnail images are displayed on the display section. Therefore, the photographer can view many thumbnail images at one time, and thus a highly convenient digital camera can be provided.

Figure 31A:
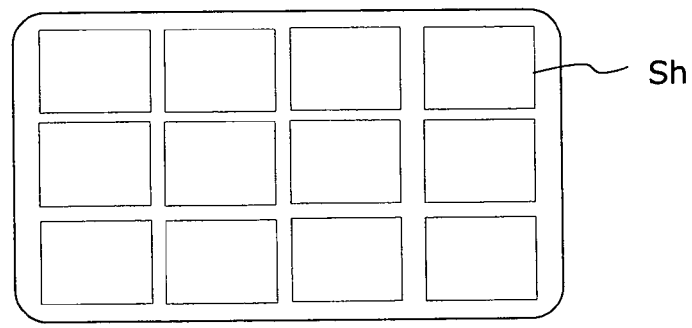
FIG. 31A is an exemplary layout for displaying horizontal images each having the aspect ratio of 4:3 in the thumbnail form on a display section having the aspect ratio of 16:9 in embodiment 3.
Figure 31B:
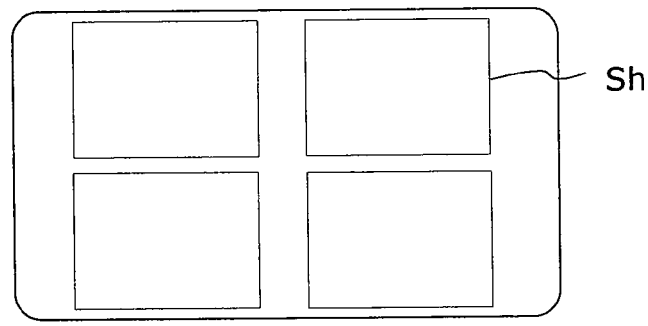
FIG. 31B is another exemplary layout for displaying the horizontal images each having the aspect ratio of 4:3 in the thumbnail form on the display section having the aspect ratio of 16:9 in embodiment 3.
Figure 31C:
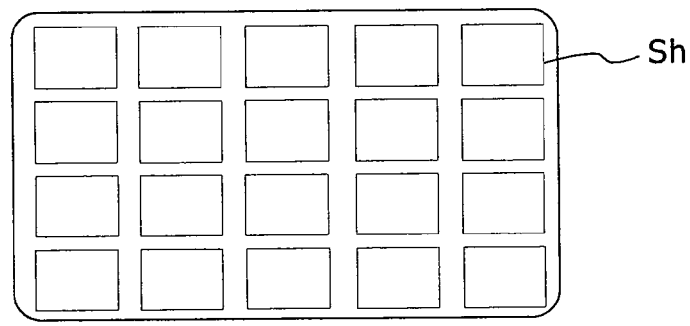
FIG. 31C is another exemplary layout for displaying the horizontal images each having the aspect ratio of 4:3 in the thumbnail form on the display section having the aspect ratio of 16:9 in embodiment 3.
Figure 32A:
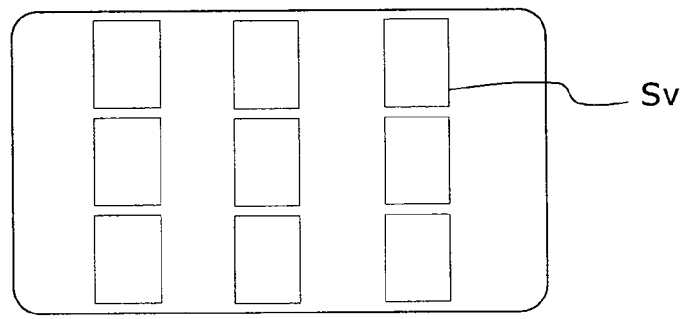
FIG. 32A is an exemplary layout for displaying vertical images each having the aspect ratio of 4:3 in the thumbnail form on the display section having the aspect ratio of 16:9 in embodiment 3.
Figure 32B:
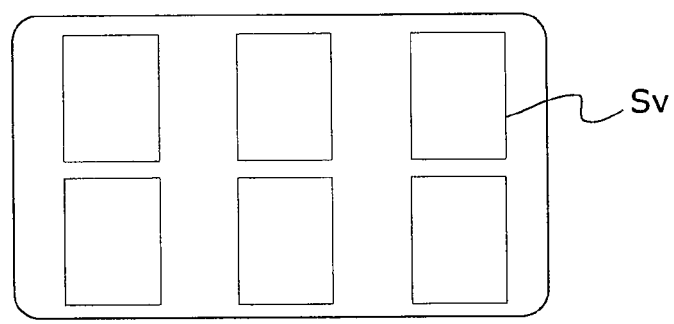
FIG. 32B is another exemplary layout for displaying the vertical images each having the aspect ratio of 4:3 in the thumbnail form on the display section having the aspect ratio of 16:9 in embodiment 3.
Figure 32C:
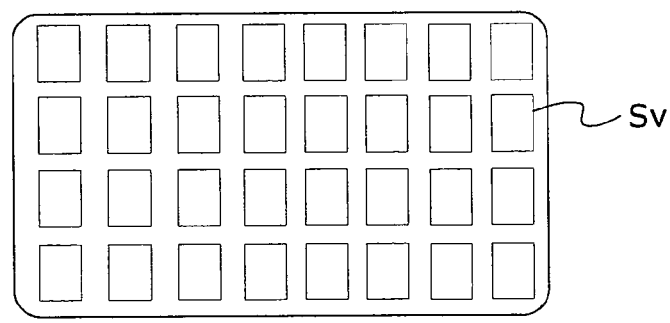
FIG. 32C is another exemplary layout for displaying the vertical images each having the aspect ratio of 4:3 in the thumbnail form on the display section having the aspect ratio of 16:9 in embodiment 3.
Figure 33A:
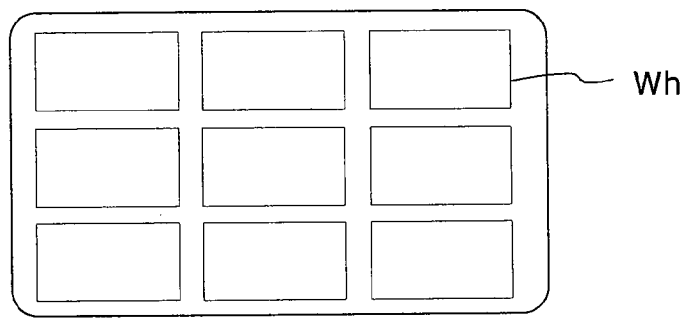
FIG. 33A is an exemplary layout horizontal images each having the aspect ratio of 16:9 in the thumbnail form on the display section having the aspect ratio of 16:9 in embodiment 3.
Figure 33B:
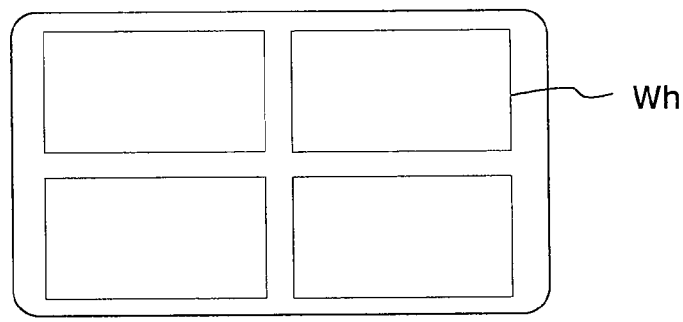
FIG. 33B is another exemplary layout for displaying the horizontal images each having the aspect ratio of 16:9 in the thumbnail form on the display section having the aspect ratio of 16:9 in embodiment 3.
Figure 33C:
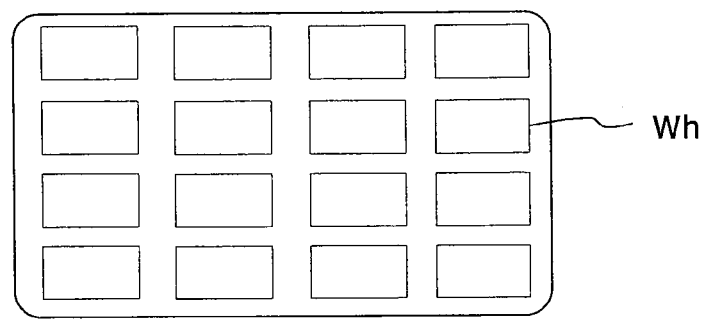
FIG. 33C is another exemplary layout for displaying the horizontal images each having the aspect ratio of 16:9 in the thumbnail form on the display section having the aspect ratio of 16:9 in embodiment 3.
Figure 34A:
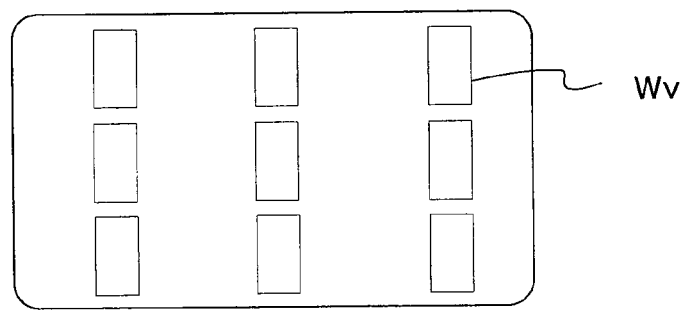
FIG. 34A is an exemplary layout for displaying vertical images each having the aspect ratio of 16:9 in the thumbnail form on the display section having the aspect ratio of 16:9 in embodiment 3.
Figure 34B:
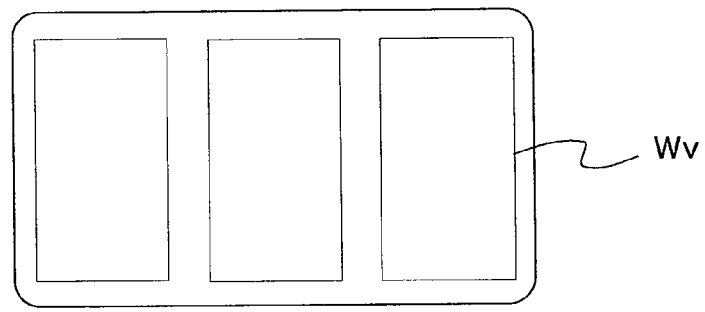
FIG. 34B is another exemplary layout for displaying the vertical images each having the aspect ratio of 16:9 in the thumbnail form on the display section having the aspect ratio of 16:9 in embodiment 3.
Figure 34C:
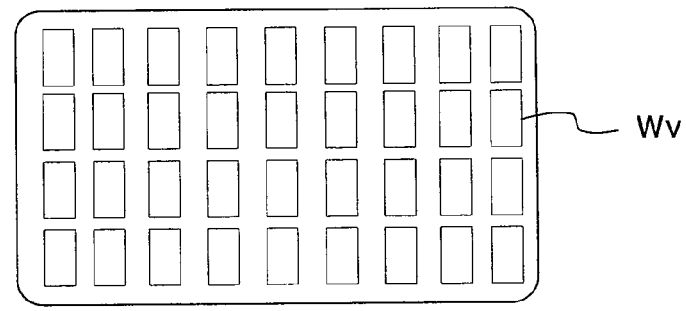
FIG. 34C is another exemplary layout for displaying the vertical images each having the aspect ratio of 16:9 in the thumbnail form on the display section having the aspect ratio of 16:9 in embodiment 3.
Figure 35A:
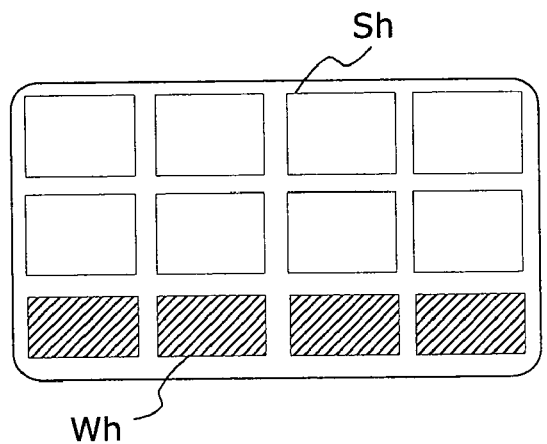
FIG. 35A is an exemplary layout for displaying horizontal images in the thumbnail form on the display section having the aspect ratio of 16:9 in embodiment 3.
Figure 35B:
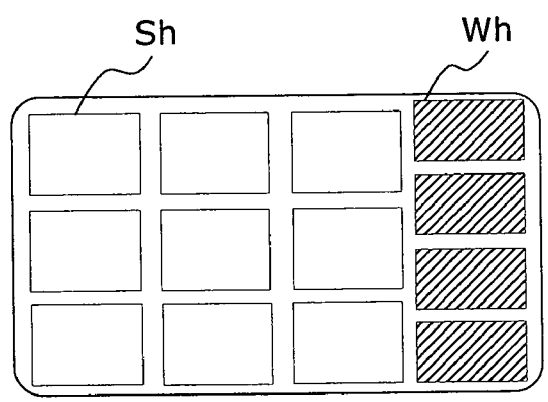
FIG. 35B is another exemplary layout for displaying the horizontal images in the thumbnail form on the display section having the aspect ratio of 16:9 in embodiment 3.
Figure 35C:
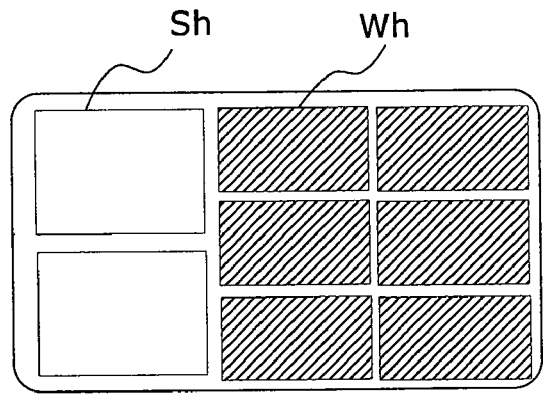
FIG. 35C is another exemplary layout for displaying the horizontal images in the thumbnail form on the display section having the aspect ratio of 16:9 in embodiment 3.
Figure 36A:
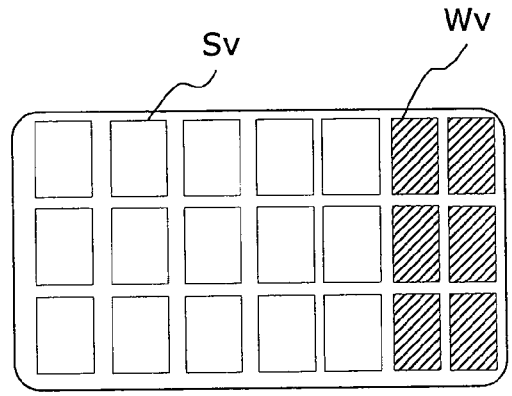
FIG. 36A is an exemplary layout for displaying vertical images in the thumbnail form on the display section having the aspect ratio of 16:9 in embodiment 3.
Figure 36B:
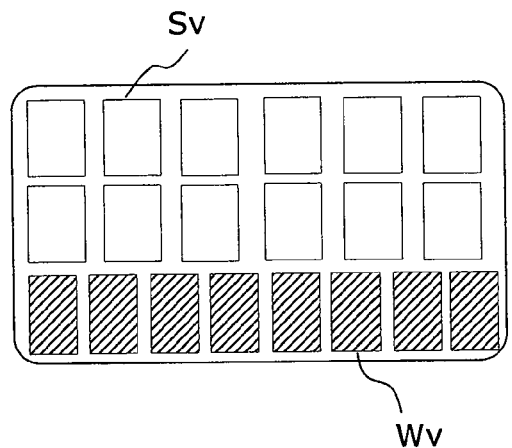
FIG. 36B is another exemplary layout for displaying the vertical images in the thumbnail form on the display section having the aspect ratio of 16:9 in embodiment 3.
Figure 36C:
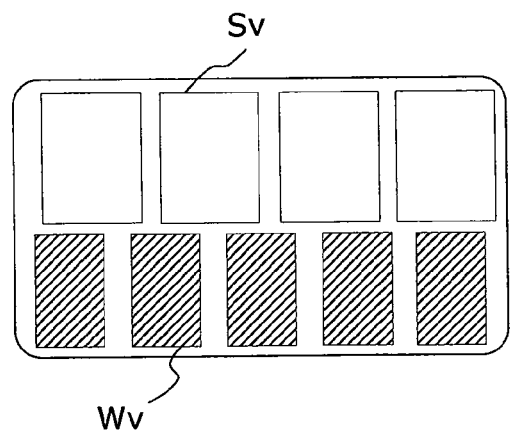
FIG. 36C is another exemplary layout for displaying the vertical images in the thumbnail form on the display section having the aspect ratio of 16:9 in embodiment 3.
Figure 37A:
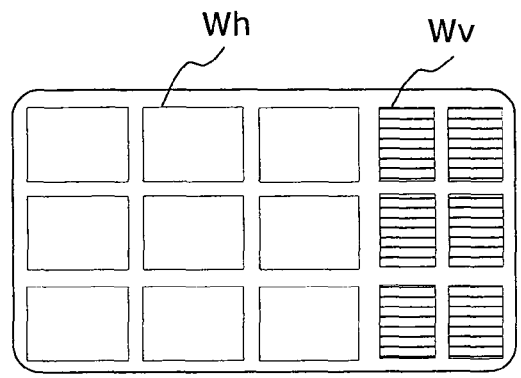
FIG. 37A is an exemplary layout for displaying images each having the aspect ratio of 4:3 in the thumbnail form on the display section having the aspect ratio of 16:9 in embodiment 3.
Figure 37B:
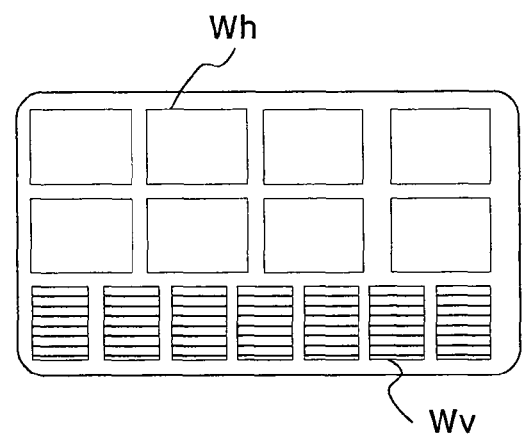
FIG. 37B is another exemplary layout for displaying the images each having the aspect ratio of 4:3 in the thumbnail form on the display section having the aspect ratio of 16:9 in embodiment 3.
Figure 37C:
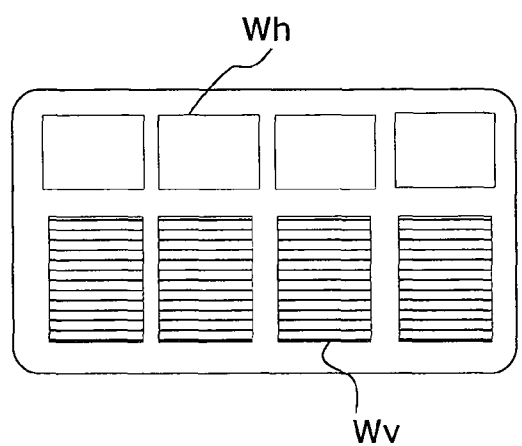
FIG. 37C is another exemplary layout for displaying the images each having the aspect ratio of 4:3 in the thumbnail form on the display section having the aspect ratio of 16:9 in embodiment 3.
Figure 38A:
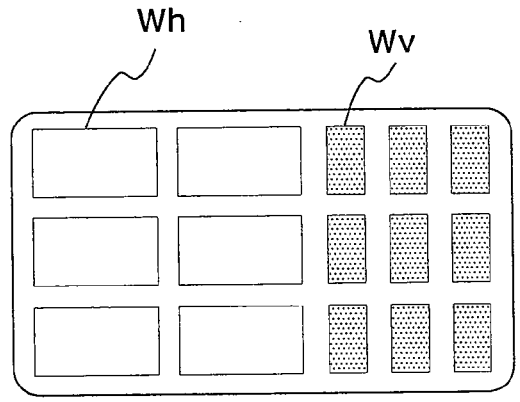
FIG. 38A is an exemplary layout for displaying images each having the aspect ratio of 16:9 in the thumbnail form on the display section having the aspect ratio of 16:9 in embodiment 3.
Figure 38B:
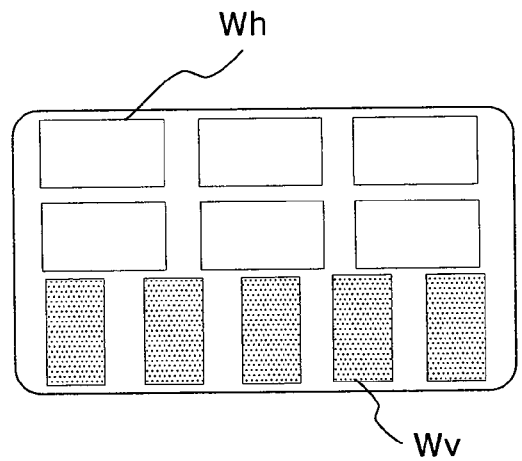
FIG. 38B is another exemplary layout for displaying the images each having the aspect ratio of 16:9 in the thumbnail form on the display section having the aspect ratio of 16:9 in embodiment 3.
Figure 38C:
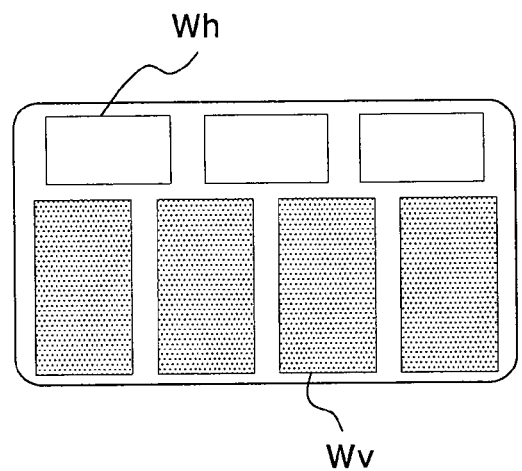
FIG. 38C is another exemplary layout for displaying the images each having the aspect ratio of 16:9 in the thumbnail form on the display section having the aspect ratio of 16:9 in embodiment 3.

The present embodiment is exemplified by a case where the aspect ratio of the display section is 4:3, but is not limited thereto. For example, the present invention may be applicable for a case where the aspect ratio of the display section is 16:9. Hereinafter, exemplary layouts will be listed. FIGS. 31A to 31C each shows an exemplary layout for displaying horizontal images each having the aspect ratio of 4:3 in the thumbnail form on a display section having the aspect ratio of 16:9. FIGS. 32A to 32C each shows an exemplary layout for displaying vertical images each having the aspect ratio of 4:3 in the thumbnail form. FIGS. 33A to 33C each shows an exemplary layout for displaying horizontal images each having the aspect ratio of 16:9 in the thumbnail form. FIGS. 34A to 34C each shows an exemplary layout for displaying vertical images each having the aspect ratio of 16:9 in the thumbnail form. FIGS. 35A to 35C each shows an exemplary layout for displaying horizontal images in the thumbnail form. FIGS. 36A to 36C each shows an exemplary layout for displaying vertical image in the thumbnail form. FIGS. 37A to 37C each shows an exemplary layout for displaying images having the aspect ratio of 4:3 in the thumbnail form. FIGS. 38A to 38C each shows an exemplary layout for displaying images having the aspect ratio of 16:9 in the thumbnail form. Figures A and B show the standard layouts and figures C show the display size priority layouts.

The digital camera according to the present embodiment displays the thumbnail images in accordance with the layout, but is not limited thereto. Information indicative of the display sizes, arrangement, and the number of displayed images is added to image files for storing image signals, and the respective thumbnail images may be displayed in accordance with the added information.

(Embodiment 4)

Figure 39:
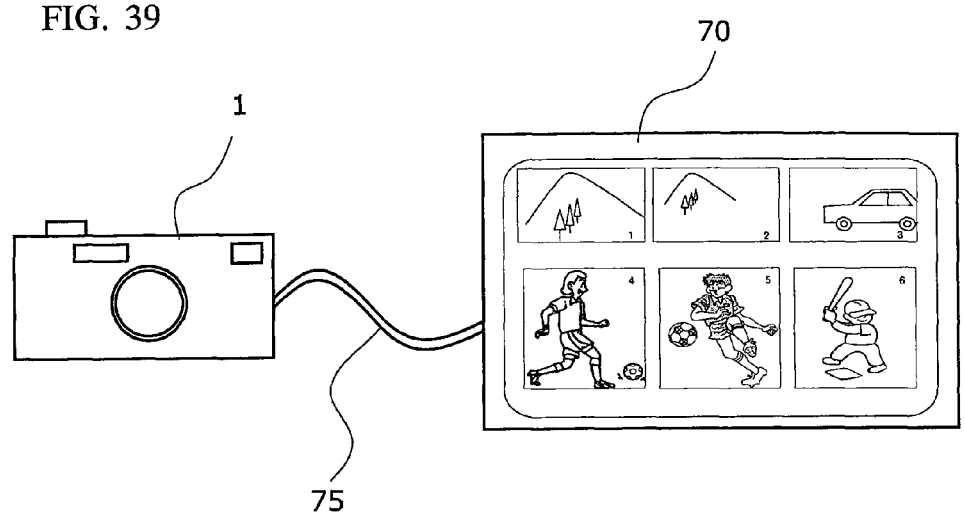
FIG. 39 is a diagram showing a digital camera and a display device according to embodiment 4.

FIG. 39 shows a digital camera and a display device according to embodiment 4. The digital camera according to the present embodiment has almost the same configuration as embodiments 1 to 3, but is different therefrom in that shot images and thumbnail images are displayed on an external display device connected to the imaging device. As shown in FIG. 39, the shot images which are recorded, together with the attitude information, in the image recording section of the digital camera 1 are displayed on a display device 70 such as a television monitor via a cable 75. The cable 75 is a USB (Universal Serial Bus) cable, for example. Images displayed on the display device 70 are controlled by the image display control section 13 of the digital camera 1. Therefore, the respective thumbnail images can be displayed on the external display device after an orientation of each of the images to be displayed are restored so as to correspond to an attitude at the time of shooting in the same manner as embodiments 1 to 3, and further display positions, the number of displayed images, display sizes and the like of the images are changed in accordance with aspect ratios, shooting attitudes and the priorities of the images.

In accordance with the above-described configuration, by operating the digital camera, images are displayed in the thumbnail form on an external television monitor or the like in a highly viewable manner. Therefore, the configuration is effective in the case where the digital camera does not have a display section, or in the case where a shot image is desired to be displayed in a further larger display size.

The present embodiment is exemplified by a case where the television monitor is used as the external display device, but is not limited thereto. For example, a configuration in which the digital camera is connected via a cable to a personal computer, which is connected to a monitor, may be applicable.

The present embodiment is exemplified by a case where the USB cable is used as the cable 75, but is not limited thereto. For example, connection may be made by using an IEEE1394 serial bus cable or made wirelessly by using a wireless LAN.

(Embodiment 5)

Figure 40:
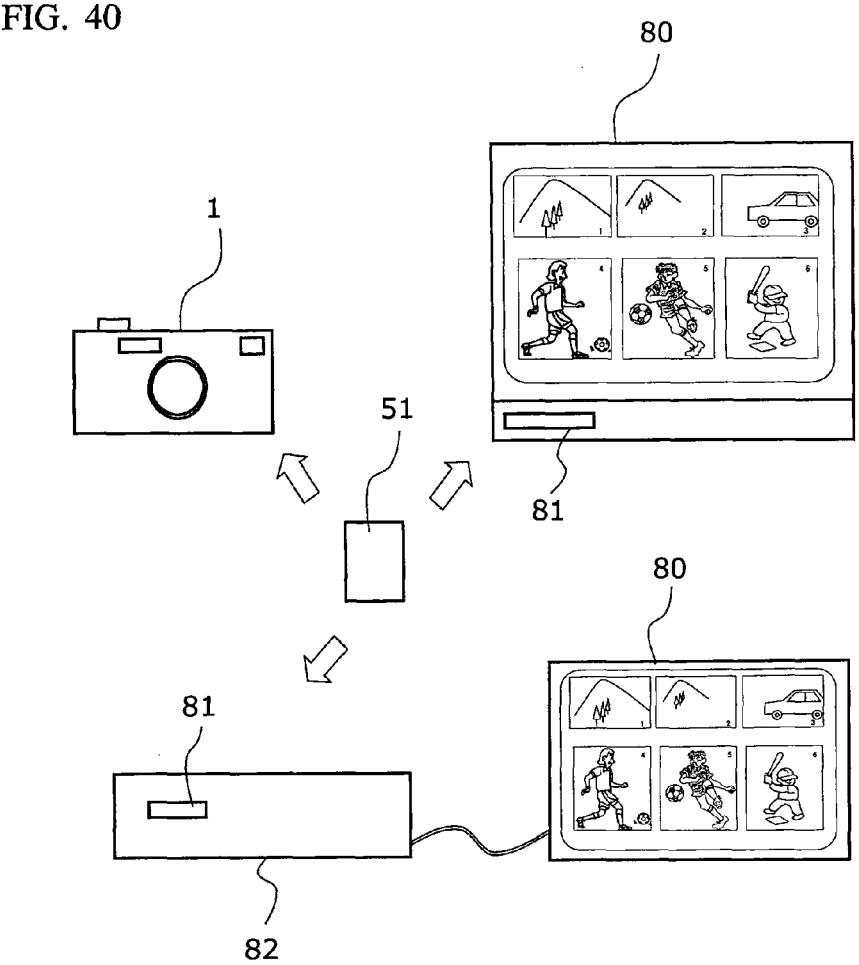
FIG. 40 is a diagram showing a display control device according to embodiment 5.
Figure 41A:
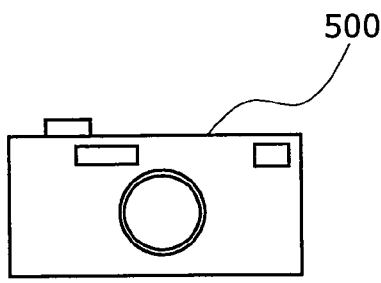
FIG. 41A is a diagram showing a relation between an attitude of a conventional digital camera and an attitude of a shot image displayed on a display section thereof.
Figure 41A:
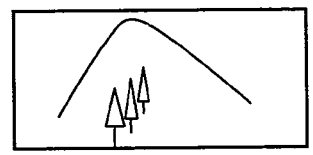
Figure 41B:
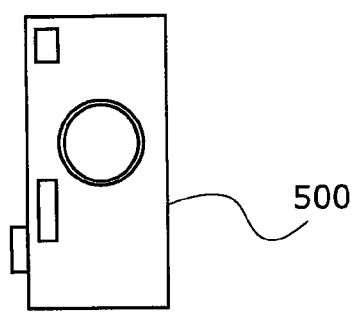
FIG. 41B is another diagram showing the relation between the attitude of the conventional digital camera and the attitude of the shot image displayed on the display section thereof.
Figure 41B:
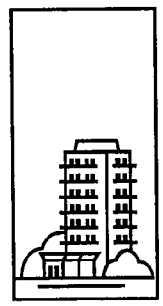
Figure 41C:
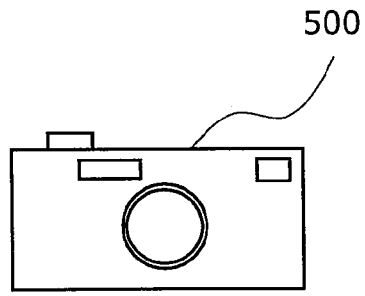
FIG. 41C is another diagram showing the relation between the attitude of the conventional digital camera and the attitude of the shot image displayed on the display section thereof.
Figure 41C:
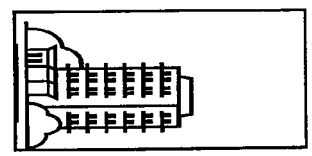
Figure 42:
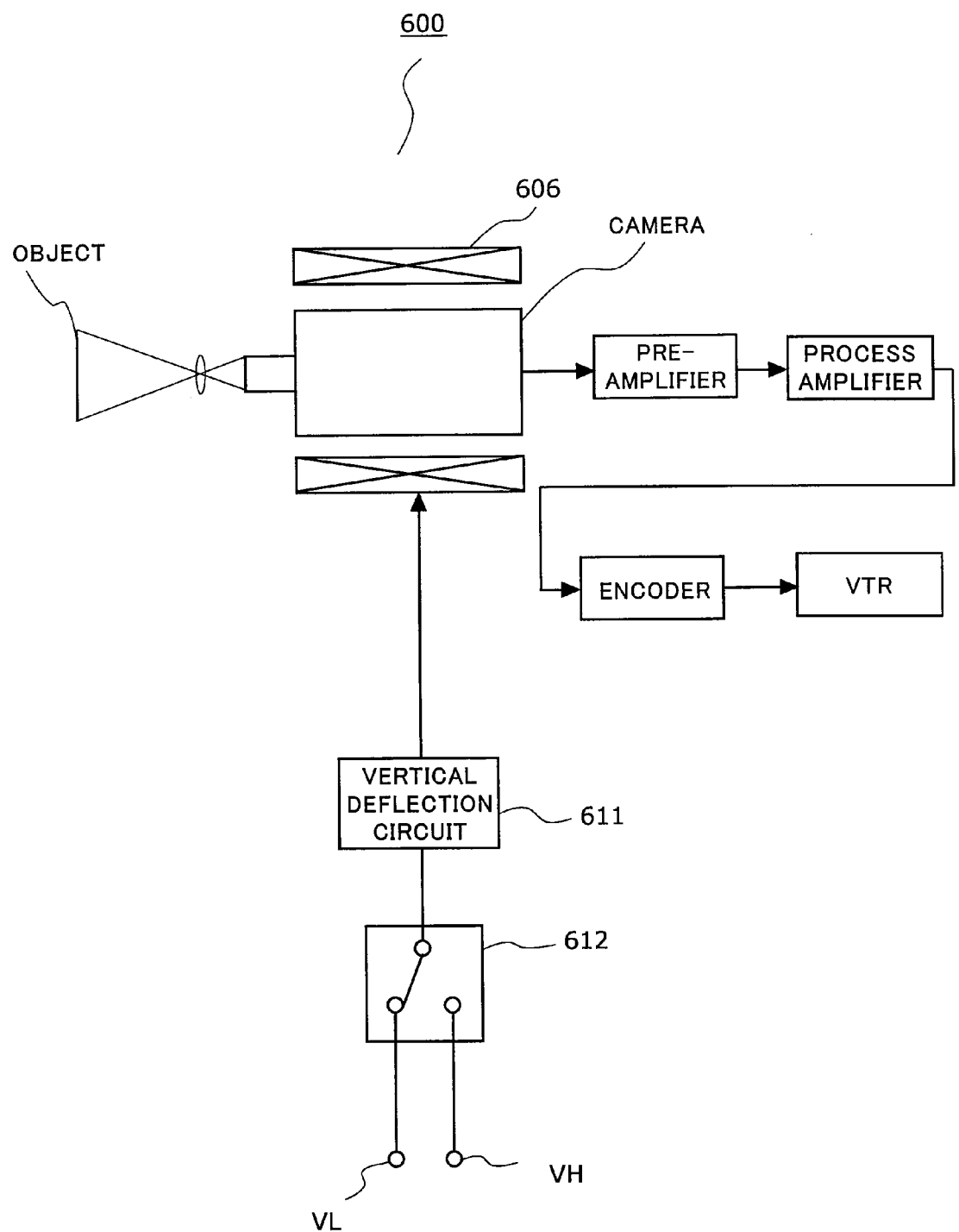
FIG. 42 is a schematic block diagram of a conventional video recording device.
Figure 43:
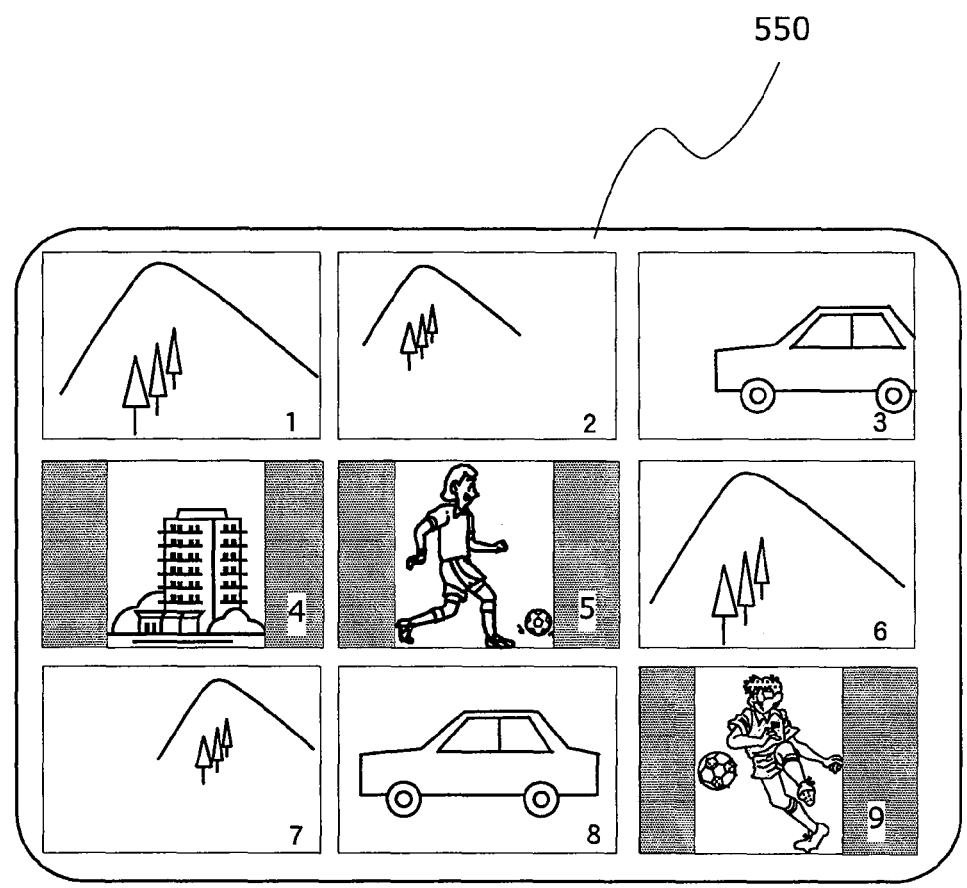
FIG. 43 is an exemplary display of a list of images shot by the conventional digital camera.

FIG. 40 shows a display control device according to embodiment 5. The digital camera in the present embodiment has almost the same configuration as those in embodiments 1 to 4, but is different therefrom in that the display control is performed by the display control device 82, whereas the display control is performed by the digital camera in each of embodiments 1 to 4. For example, the display control device 82 corresponds to the personal computer, the monitor, or the like which includes image processing software. Images shot by the digital camera 1 are recorded in the removable memory 51 such as a detachable memory card together with thumbnail images, attitude determination signals and aspect ratio determination signals. The removable memory 51 is not limited to the memory card, but may be a hard disk or an optical disk. The shot images are displayed on the display device 80 which includes a removable memory insertion section 81 capable of reading the removable memory 51 and the display control device. The images displayed on the display device is display-controlled by the display control device in a manner similar to that performed in each of embodiments 1 to 3, in accordance with the attitude determination signal 60 and the aspect ratio determination signal 61 recorded in the removable memory 51.

In accordance with the above-described configuration, the display control device 82 according to the present embodiment reads, from the removable memory 51, the shot images, the thumbnail images, the attitude determination signals, and the aspect ratio determination signals which were obtained from the digital camera 1 and which are recorded in the removable memory 51, and causes the thumbnail image to be displayed on the display device in an easily viewable manner, as with embodiments 1 to 3, in accordance with the attitude information and the aspect ratio information.

The display device including the display control device is exemplified by a personal computer, but is not limited thereto. For example, as shown in FIG. 40, the images may be displayed on the television monitor via a hard disk recorder, a DVD recorder and the like which are capable of reading the removable memory 51.

The present embodiment is exemplified by the display device including the removable memory insertion section 81 and the display control device, but is not limited thereto. For example, a configuration may be applicable in which a reading device such as a memory card reader which is capable of reading the removable memory 51, the display control device, and the display device are connected to one another.

In embodiments 4 and 5, the layout storage section which stores therein the plurality of layouts may be included in the digital camera, or may be included in the display device or in the display control device.

In embodiment 4 or 5, the shot images are displayed on the external display device, but are not limited thereto. For example, a similar effect can be obtained from a configuration which is connected to printing means such as a printer.

Embodiments 1 to 5 are each exemplified by a case where the digital camera includes one shutter operation section, but is not limited thereto. For example, a shutter operation section for shooting in the horizontal shooting attitude and a shutter operation section for shooting in the vertical shooting attitude may be provided separately, and the shooting attitude may be determined in accordance with the use of either of the shutter operation sections.

Embodiments 1 to 5 are each exemplified by a case where the shot image is the still image. However, a similar effect can be obtained even in the case of a moving image or a simplified moving image.

Embodiments 1 to 5 are each exemplified by a case where the horizontal shooting attitude is set to 0 degrees, and the attitude of the digital camera when the digital camera is rotated about the optical axis by 90 degrees, from the horizontal shooting attitude is set as the vertical shooting attitude. However, a similar effect can be obtained when the digital camera is rotated by −90 degrees. Further, an attitude determination signal (2) may be set as the attitude determination signal of the attitude which is obtained by rotating the digital camera by −90 degrees, such that three types of attitudes, i.e., one type of the horizontal shooting attitude and two types of the vertical shooting attitudes, may be detected.

Embodiments 1 to 5 are each exemplified by a case where the attitude determination signal (0) or (1) are added, but are not limited there to. For example, the signal may be added only in the case of the vertical shooting attitude. Further, the attitude determination signal is not necessarily recorded on the shot image. The attitude determination signal may be recorded in a file different from that having the image signal recoded therein, and the image file having the image signal recorded therein and the attitude determination file having the attitude determination signal recorded therein may be inter-related to each other. In a similar manner, the aspect ratio determination signal may be recorded in a file different from that having the shot image recorded therein.

Embodiments 1 to 5 are each exemplified by a case where the aspect ratio of the shot image is switched between 4:3 and 16:9 through the aspect ratio switching processing, but are not limited thereto. The shot image may be switched to another aspect ratio of 3:2, for example. When the aspect ratio can be switched among three or more types of aspect ratios, the aspect ratio determination signal to be additionally added to an image signal may start from the aspect ratio determination signal 61 (3) in sequence.

Embodiments 1 to 5 are each exemplified by a case where the aspect ratios of the imaging sensor and the shot image are either 4:3 or 16:9. However, without limiting to these two types, the aspect ratios may be set arbitrarily. For example, the aspect ratios of the imaging sensor and the shot image may be 3:2 and the like.

Embodiments 1 to 5 are each exemplified by a case where the aspect ratio of the display section is, for example, 4:3 or 16:9, that is, a horizontal width is set as a long side, but are not limited thereto. A similar effect can be obtained in the case of a display section whose vertical height is set as the long side thereof.

INDUSTRIAL APPLICABILITY

The imaging device, the display control device, and the display device according to the present invention are suitable to a digital still camera, a digital video camera, a camera-equipped cellular phone, a PDA, a DVD recorder, a hard disk recorder and the like which are required, in relation to a display method of shot images, to have a convenient display.

The invention claimed is:

1. An imaging device for outputting optical images of objects as electrical image signals, the imaging device comprising:
    an imaging optical system for forming the optical images of the objects;
    an imaging sensor for receiving the optical images of the objects formed by the imaging optical system, for converting the optical images into the electrical image signals, and for outputting the electrical image signals;
    an aspect ratio switching section for switching aspect ratios of shot images based on the outputted image signals;
    an image recording section for interrelating and recording the outputted image signals and aspect ratio information indicative of the aspect ratios;
    a display section for displaying reduced images based on the recorded image signals;
    a specification section for receiving a specification made by a user with respect to the aspect ratio information of the reduced images to be displayed on the display section; and
    an image display control section for determining a location and a display size of each of the reduced images on the display section, and the number of the reduced images displayed on the display section in accordance with the specified aspect ratio information, and for causing the reduced images to be displayed on the display section,
    wherein, when reduced images in which the aspect ratio information is different are displayed on the display section in a mixed manner, the image display control section causes reduced images, in which the aspect ratio information is common, to be displayed in clusters in a predetermined area on the display section.

2. The imaging device according to claim 1, further comprising
    an attitude detection section for detecting an attitude of the imaging device at the time of shooting, wherein
    the image recording section interrelates and records the image signals, the aspect ratio information, and attitude information indicative of the detected attitude,
    the specification section specifies at least one of the aspect ratio information and the attitude information on the reduced images to be displayed on the display section, and
    the image display control section determines the location and the display size of each of the reduced images, and the number of the display reduced images in accordance with the specified at least one of the aspect ratio information and the attitude information, restores an orientation of each of the reduced images so as to correspond to the attitude of the imaging device at the time of the shooting in accordance with the attitude information, and causes the restored reduced images to be displayed on the display section.

3. The imaging device according to claim 2, wherein when reduced images in which at least one of the aspect ratio information and the attitude information is different are displayed on the display section in a mixed manner, the image display control section causes reduced images, in which at least one of the aspect ratio information and the attitude information is common, to be displayed in clusters in a predetermined area on the display section.

4. The imaging device according to claim 2, wherein the image display control section extracts image signals corresponding to the at least one of the aspect ratio information and the attitude information which is specified by the specification section, from the image signals recorded in the image recording section, and causes reduced images to be displayed on the display section based on the extracted image signals.

5. The imaging device according to claim 2, further comprising:
    a layout storage section for storing layouts indicative of the location and the display size of each of the reduced images on the display section, and the number of the reduced images displayed on the display section; and
    a priority receiving section for receiving a specification made by the user with respect to whether the display size of each of the reduced images on the display section or the number of the reduced images displayed on the display section is given a priority, wherein
    the layouts include a number-of-display-images priority layout in which the number of the reduced images displayed on the display section is given the priority, and a display size priority layout in which the display size of each of the reduced images is given the priority, and the image display control section selects a layout in accordance with the specification which is made by the user and which is received by the priority receiving section, and causes the respective reduced images to be displayed on the display section in accordance with the selected layout.

6. The imaging device according to claim 2, further comprising an image recording control section for recording image signals, in which at least one of the aspect ratio information and the attitude information is common, in a common folder in the image recording section.

7. An imaging device which outputs optical images of objects as electrical image signals, and which is connectable to a display device, the imaging device comprising:

an imaging optical system for forming the optical images of the objects;

an imaging sensor for receiving the optical images of the objects formed by the imaging optical system, for converting the optical images into the electrical image signals, and for outputting the electrical image signals;

an aspect ratio switching section for switching aspect ratios of shot images based on the outputted image signals;

an image recording section for interrelating and recording the outputted image signals and aspect ratio information indicative of the aspect ratios;

a specification section for receiving a specification made by a user with respect to the aspect ratio information of reduced images to be displayed on the display device; and a display control signal output section for determining a location and a display size of each of the reduced images on the display device, and the number of the reduced images displayed on the display device in accordance with the specified aspect ratio information, and for outputting a display control signal for causing the reduced images to be displayed on the display device, wherein, when reduced images in which the aspect ratio information is different are displayed on the display section in a mixed manner, the display control signal output section outputs the display control signal for causing reduced images, in which the aspect ratio information is common, to be displayed in clusters in a predetermined area on the display section.

8. The imaging device according to claim 7, wherein, when reduced images in which at least one of the aspect ratio information and the attitude information is different are displayed on the display device in a mixed manner, the display control signal output section outputs the display control signal which causes reduced images, in which at least one of the aspect ratio information and the attitude information is common, to be displayed in clusters in a predetermined area on the display device.

9. The imaging device according to claim 7, further comprising an attitude detection section for detecting an attitude of the imaging device at the time of shooting, wherein:

the image recording section interrelates and records the image signal, the aspect ratio information and the attitude information indicative of the detected attitude, the specification section specifies at least one of the aspect ratio information and the attitude information of the reduced images to be displayed on the display device, and the display control signal output section extracts image signals corresponding to the at least one of the aspect ratio information and the attitude information which is specified by the specification section, from the image signals recorded in the image recording section, and outputs the display control signal which causes reduced images to be displayed on the display section based on the extracted image signals.

10. A display control device which is connectable to a display device having a display section, the display control device comprising:

a reading section for reading image signals recorded in a recording section, and aspect ratio information which correspond to the image signals;

a specification section for receiving a specification made by a user with respect to the aspect ratio information of reduced images to be displayed on the display device; and a display control signal output section for determining a location and a display size of each of the reduced images on the display section, and the number of the reduced images displayed on the display section in accordance with the specified aspect ratio information, and for outputting a display control signal for causing the restored reduced images to be displayed on the display section, wherein, when reduced images in which the aspect ratio information is different are displayed on the display section in a mixed manner, the display control signal output section outputs the display control signal for causing reduced images, in which the aspect ratio information is common, to be displayed in clusters in a predetermined area on the display section.

11. The display control device according to claim 10, wherein, when reduced images in which at least one of the aspect ratio information and the attitude information is different are displayed on the display section in a mixed manner, the display control signal output section outputs the display control signal which causes reduced images, in which at least one of the aspect ratio information and the attitude information is common, to be displayed in clusters in a predetermined area on the display section.

12. The display control device according to claim 10, wherein:

the reading section reads the image signal, the aspect ratio information and attitude information which correspond to the image signal, the specification section specifies at least one of the aspect ratio information and the attitude information of the reduced images to be displayed on the display section, and the display control signal output section extracts image signals corresponding to at least one of the aspect ratio information and the attitude information which is specified by the specification section, from the image signals recorded in the image recording section, and outputs the display control signal which causes reduced images based on the extracted image signals to be displayed on the display section.

13. The display control device according to claim 10, further comprising:

a layout storage section for storing layouts indicative of the location and the display size of each of the reduced images on the display section, and the number of the reduced images displayed on the display section; and a priority receiving section for receiving a specification made by the user with respect to whether the display size of each of the reduced images on the display section or the number of the reduced images displayed on the display section is given a priority, wherein the layouts include a number-of-display-images priority layout in which the number of the reduced images displayed on the display section is given the priority, and a display size priority layout in which the display size of each of the reduced images is given the priority, and the display control signal output section selects a layout in accordance with the specification which is made by the user and which is received by the priority receiving section, and outputs the display control signal which causes the reduced images to be displayed on the display section in accordance with the selected layout.

14. An image display system including an imaging device for outputting optical images of objects as electrical image signals and a display device for displaying shot images, wherein:

the imaging device comprises:
an imaging optical system for forming the optical images of the objects;
an imaging sensor for receiving the optical images of the objects formed by the imaging optical system, for converting the optical images into the electrical image signals, and for outputting the electrical image signals;
an aspect ratio switching section for switching aspect ratios of shot images based on the outputted image signals;
an image recording section for interrelating and recording the outputted image signals and aspect ratio information indicative of the aspect ratios;
a specification section for receiving a specification made by a user with respect to the aspect ratio information of reduced images to be displayed on the display device; and
a display control signal output section for determining a location and a display size of each of the reduced images on the display device, and the number of the reduced images displayed on the display device in accordance with the specified aspect ratio information, and for outputting a display control signal for causing the reduced images to be displayed on the display device, the display device comprises:
a receiving section for receiving the recorded image signals and the outputted display control signal; and
a display section for displaying the reduced image based on the image signals in accordance with the display control signal, and
when reduced images in which the aspect ratio information is different are displayed on the display section in a mixed manner, the display control signal output section outputs the display control signal for causing reduced images, in which the aspect ratio information is common, to be displayed in clusters in a predetermined area on the display section.

15. The image display system according to claim 14, further comprising an attitude detection section for detecting an attitude of the imaging device at the time of shooting, wherein:

the image recording section interrelates and records the image signal, the aspect ratio information and the attitude information indicative of the detected attitude,
the specification section specifies at least one of the aspect ratio information and the attitude information of the reduced images to be displayed on the display device, and
when reduced images in which at least one of the aspect ratio information and the attitude information is different are displayed on the display device in a mixed manner, the display control signal output section outputs the display control signal which causes reduced images, in which at least one of the aspect ratio information and the attitude information is common, to be displayed in clusters in a predetermined area on the display section.

16. The image display system according to claim 15, wherein the image display control section extracts image signals corresponding to the at least one of the aspect ratio information and the attitude information which is specified by the specification section, from the image signals recorded in the image recording section, and outputs the display control signal which causes reduced images based on the extracted image signals to be displayed on the display section.

17. An imaging system including a lens barrel and an imaging device which is detachably fixed to the lens barrel, wherein:

the lens barrel comprises:
an imaging optical system for forming optical images of objects,
the imaging device comprises:
an imaging sensor for receiving the optical images of the objects formed by the imaging optical system connected thereto, for converting the optical images into the electrical image signals, and for outputting the electrical image signals;
an aspect ratio switching section for switching aspect ratios of shot images based on the outputted image signals;
an image recording section for interrelating and recording the outputted image signals and aspect ratio information indicative of the aspect ratios;
a display section for displaying reduced images based on the recorded image signals;
a specification section for receiving a specification made by a user with respect to the aspect ratio information of the reduced images to be displayed on the display section; and
an image display control section for determining a location and a display size of each of the reduced images on the display section, and the number of the reduced images on the display section in accordance with the specified aspect ratio information, and for causing the reduced images to be displayed on the display section,
when reduced images in which the aspect ratio information is different are displayed on the display section in a mixed manner, the image display control section causes reduced images, in which the aspect ratio information is common, to be displayed in clusters in a predetermined area on the display section.

18. The imaging system according to claim 17, wherein:
the imaging device further comprises an attitude detection section for detecting an attitude of the imaging device at the time of shooting,
the image recording section interrelates and records the image signal, the aspect ratio information and the attitude information indicative of the detected attitude,
the specification section specifies at least one of the aspect ratio information and the attitude information of the reduced images to be displayed on the display device, and
when reduced images in which at least one of the aspect ratio information and the attitude information is different are displayed on the display section in a mixed manner, the image display control section causes reduced images, in which at least one of the aspect ratio information and the attitude information is common, to be displayed in clusters in a predetermined area on the display section.

19. The imaging system according to claim 18, wherein the image display control section extracts image signals corresponding to the at least one of the aspect ratio information and the attitude information which is specified by the specification section, from the image signals recorded in the image recording section, and causes reduced images based on the extracted image signals to be displayed on the display section.

20. The imaging system according to claim 17, wherein:
the lens barrel further comprises an attitude detection section for detecting an attitude of the imaging device at the time of shooting,
the image recording section interrelates and records the image signal, the aspect ratio information and the attitude information indicative of the detected attitude,
the specification section specifies at least one of the aspect ratio information and the attitude information of the reduced images to be displayed on the display device, and when reduced images in which at least one of the aspect ratio information and the attitude information is different are displayed on the display section in a mixed manner, the image display control section causes reduced images, in which at least one of the aspect ratio information and the attitude information is common, to be displayed in clusters in a predetermined area on the display section.

21. The imaging system according to claim 20, wherein the image display control section extracts image signals corresponding to the at least one of the aspect ratio information and the attitude information which is specified by the specification section, from the image signals recorded in the image recording section, and causes reduced images based on the extracted image signals to be displayed on the display section.

* * * * *